US012279087B2

(12) United States Patent
Wurts

(10) Patent No.: US 12,279,087 B2
(45) Date of Patent: Apr. 15, 2025

(54) SPEAKER RESONATOR

(71) Applicant: William Aldis Wurts, Princeton, KY (US)

(72) Inventor: William Aldis Wurts, Princeton, KY (US)

( * ) Notice: Subject to any disclaimer, the term of this patent is extended or adjusted under 35 U.S.C. 154(b) by 0 days.

(21) Appl. No.: 18/819,219

(22) Filed: Aug. 29, 2024

(65) Prior Publication Data

US 2025/0080900 A1 Mar. 6, 2025

Related U.S. Application Data

(60) Provisional application No. 63/579,539, filed on Aug. 30, 2023.

(51) Int. Cl.
*H04R 1/28* (2006.01)

(52) U.S. Cl.
CPC ......... *H04R 1/2873* (2013.01); *H04R 1/2811* (2013.01); *H04R 1/2896* (2013.01)

(58) Field of Classification Search
CPC ... H04R 1/2873; H04R 1/2811; H04R 1/2896
See application file for complete search history.

(56) References Cited

FOREIGN PATENT DOCUMENTS

| | | | |
|---|---|---|---|
| CN | 102543048 | A | 7/2012 |
| ES | 1195533 | U | 10/2017 |
| JP | 2011211623 | A | 10/2011 |
| WO | 2018076917 | A1 | 5/2018 |

*Primary Examiner* — Brian Ensey
(74) *Attorney, Agent, or Firm* — Robinson IP Law, PLLC

(57) ABSTRACT

Various implementations include a speaker resonator device. The device includes a base plate, one or more spacers, and a resonator plate. The base plate has a first base side and a second base side. The spacers each have a first spacer end and a second spacer end. The second spacer end of each of the spacers contacts the first base side. Each of the spacers extends away from the first base side. The resonator plate has a first resonator side and a second resonator side. The second spacer end of each of the spacers contacts the second resonator side. The first base side and the second resonator side are spaced apart from each other such that, when a speaker is disposed on the first resonator side, the sound from the speaker resonates between the resonator plate and the base plate.

28 Claims, 14 Drawing Sheets

SPEAKER RESONATOR

BACKGROUND

Sound system speakers (loudspeakers) reproduce various musical notes, voices (etc.) by causing air to vibrate with various transducers (typically diaphragm-like structures). A substantial amount of those air vibrations create sound. However, some of those vibrations are transferred to the speaker box or shell. For small speakers, a significant portion of the sound energy is transferred to the speaker shell, especially in small, wireless remote speakers. Furthermore, remote speakers often have transducer diameters less than or equal to 4.5", which limits vibrating surface area as well as the depth and volume of bass to lower mid-range sound (frequencies) produced.

Much of the speaker box/shell vibration is transferred to (or absorbed by) the surface the speaker is placed on—counter, table, desk, shelf, etc. As a result, sound energy is lost. This can negatively affect the quality of the sound produced by sound-system speakers (e.g., muting and bass to lower mid-range blurring).

SUMMARY

Various implementations include a speaker resonator device. The device includes a base plate, one or more spacers, and a resonator plate. The base plate has a first base side and a second base side opposite and spaced apart from the first base side. The one or more spacers each have a first spacer end and a second spacer end opposite and spaced apart from the first spacer end. The second spacer end of each of the one or more spacers contacts the first base side. Each of the one or more spacers extends away from the first base side. The resonator plate has a first resonator side and a second resonator side opposite and spaced apart from the first resonator side. The first spacer end of each of the one or more spacers contacts the second resonator side. The first base side and the second resonator side are spaced apart from each other such that, when a speaker is disposed on the first resonator side, sound from the speaker resonates in a space between the resonator plate and the base plate.

In some implementations, the second spacer end of each of the one or more spacers is coupled to the first base side. In some implementations, the first spacer end of each of the one or more spacers is coupled to the second resonator side.

In some implementations, the device further includes an outer ring having a first ring end and a second ring end opposite and spaced apart from the first ring end. In some implementations, the first ring end is coupled to and extends from the second resonator side toward the first base side. In some implementations, an outwardly facing surface of the ring is flush with a perimetrical edge of the resonator plate. In some implementations, an annular gap is defined between the outer ring and the first base side. In some implementations, the gap has a width of between 3 mm and 4.5 mm as measured between the first base side and the outer ring. In some implementations, the one or more spacers are at least partially disposed within the outer ring.

In some implementations, the one or more spacers include an outer ring extending from the second resonator side of the resonator plate toward the first base side. In some implementations, the first base side includes one or more felt pads. In some implementations, the outer ring contacts the one or more felt pads of the first base side.

In some implementations, one of the first spacer end or the second spacer end of each of the one or more spacers includes a felt pad that contacts the second resonator side or the first base side, respectively.

In some implementations, one of the first base side or the second resonator side includes one or more felt pads that contacts the second spacer end or the first spacer end of each of the one or more spacers. In some implementations, the one of the first base side or the second resonator side defines one or more channels, wherein the one or more felt pads are disposed within the one or more channels.

In some implementations, the one or more spacers each include a first spacer portion and a second spacer portion. In some implementations, the first spacer portion includes an outer ring having a first ring end and a second ring end opposite and spaced apart from the first ring end. In some implementations, the first ring end is coupled to and extends from the second resonator side toward the first base side. In some implementations, the second spacer portion extends from the first base side and contacts the second ring end.

In some implementations, the base has a circular cross-section in a plane parallel to the first base side. In some implementations, the resonator plate has a circular cross-section in a plane parallel to the first resonator side.

In some implementations, each of the spacers has a longitudinal axis extending from the first spacer end to the second spacer end. In some implementations, each of the spacers has a circular cross-section in a plane perpendicular to the longitudinal axis.

In some implementations, the one or more spacers include three or more spacers.

In some implementations, the one or more spacers are circumferentially spaced apart from each other adjacent to a perimetrical edge of the base plate and/or the resonator plate.

In some implementations, the device further includes one or more vibration absorbent feet coupled to the second base side.

In some implementations, the sound from the speaker resonates between the resonator plate and the base plate at predetermined resonant frequencies.

In some implementations, the base plate or resonator plate includes wood.

In some implementations, the first base side defines at least one sound hole extending to the second base side.

In some implementations, the base plate has a thickness as measured from the first base side to the second base side. In some implementations, the resonator plate has a thickness as measured from the first resonator side to the second resonator side. In some implementations, the thickness of the base plate and/or the resonator plate is in the range of 1 mm-50 mm. In some implementations, the thickness of the base plate is different than the thickness of the resonator plate. In some implementations, the thickness of the base plate is the same as the thickness of the resonator plate.

In some implementations, the base plate has a largest width. In some implementations, the resonator plate has a largest width. In some implementations, the largest width of the base plate or the resonator plate is in the range of 10 cm-95 cm. In some implementations, the largest width of the base plate is different than the largest width of the resonator plate. In some implementations, the largest width of the base plate is the same as the largest width of the resonator plate.

In some implementations, each of the spacers has a length as measured from the first spacer end to the second spacer end. In some implementations, the length is in the range of 3 mm-460 mm. In some implementations, each of the spacers has a largest width. In some implementations, the largest width is in the range of 6 mm-80 mm.

BRIEF DESCRIPTION OF DRAWINGS

Example features and implementations of the present disclosure are disclosed in the accompanying drawings. However, the present disclosure is not limited to the precise arrangements and instrumentalities shown. Similar elements in different implementations are designated using the same reference numerals.

DETAILED DESCRIPTION

Figure 1A:
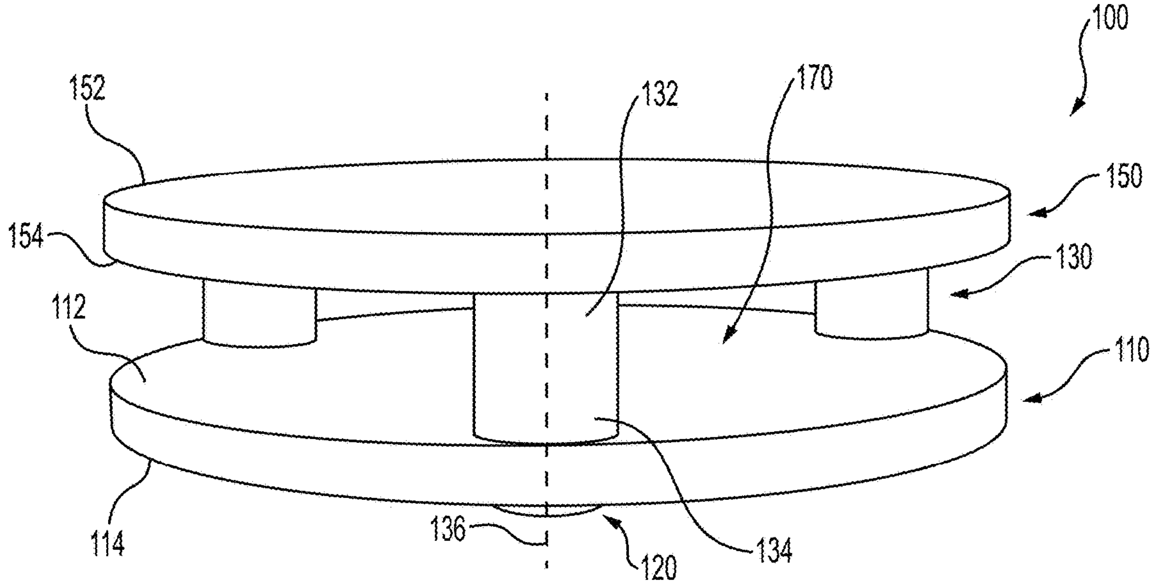
FIG. 1A is a top perspective view of a speaker resonator device, according to one implementation.
Figure 1B:
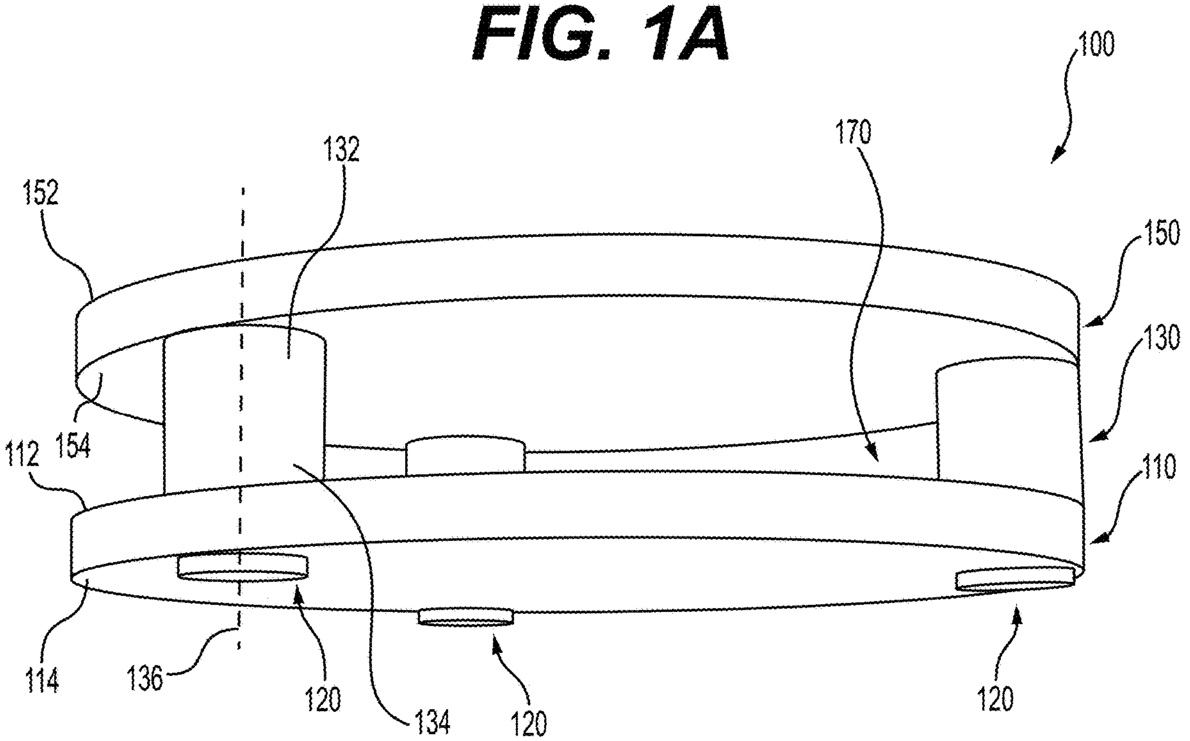
FIG. 1B is a bottom perspective view of the speaker resonator device of FIG. 1A.
Figure 1C:
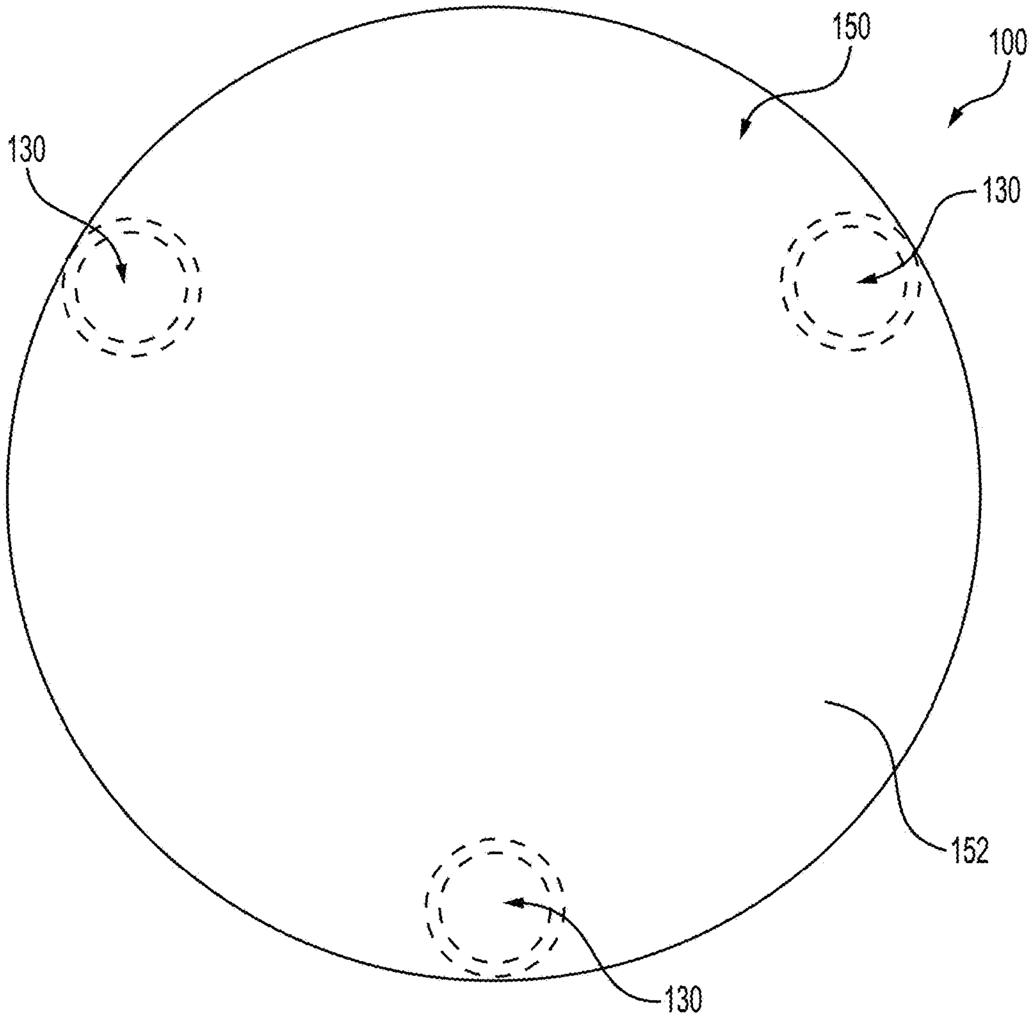
FIG. 1C is a top view of the speaker resonator device of FIG. 1A.
Figure 1D:
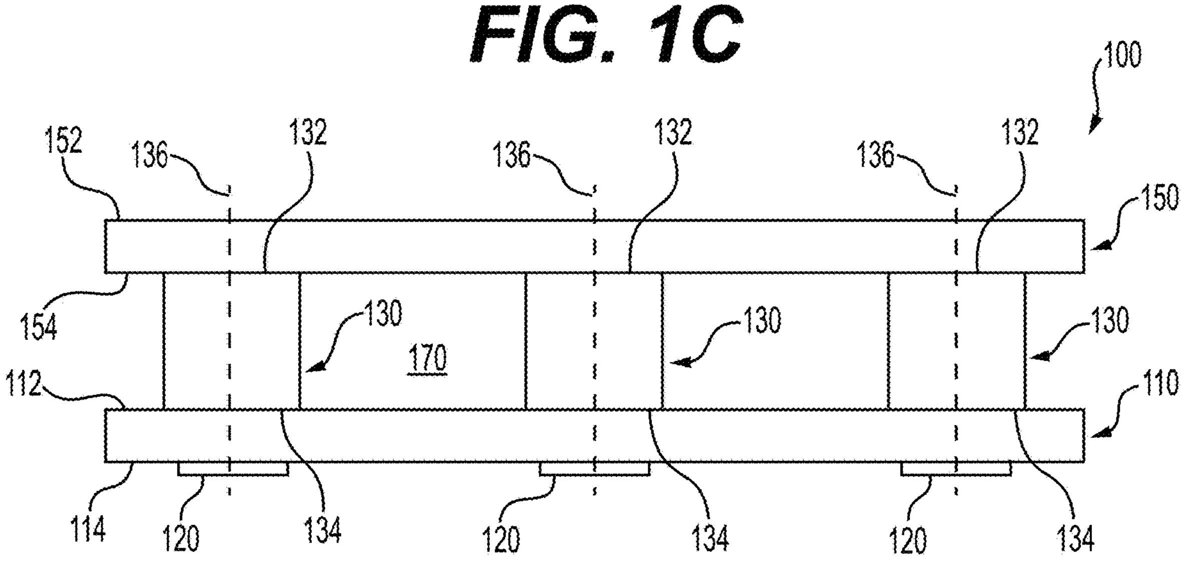
FIG. 1D is a side view of the speaker resonator device of FIG. 1A.

The devices, systems, and methods disclosed herein provide for a speaker base that resonates with various desired sound frequencies (i.e., resonant frequencies). The speaker resonator base can be insulated from the surface it is placed on using vibration absorbent feet to prevent further loss of desired and augmented frequencies. The speaker resonator base can be built with multiple plates made from materials with the desired spectrum of resonant frequencies (e.g., wood, ceramics, plastics, composites, fibers, metals). The plate diameter, thickness, and separation can be varied according to the desired frequency responses.

The speaker shell/box vibrates with frequencies that are generated by the speaker's transducers. Like vibrating guitar strings, the speaker shell vibrations are transferred to the resonating plates and base plate. These plates augment certain frequencies (sounds) through resonance. The speaker resonator base materials are chosen to augment the sound frequencies desired. Resonance can improve the depth and volume of sound produced, especially in the bass and lower mid-range.

Resonance occurs when objects naturally vibrate more dynamically at certain frequencies (i.e., resonance frequencies) and not others. The vibrations of the strings on a guitar are transferred to the soundboard and back of the guitar. The soundboard and back provide more vibrating surface area, increasing the volume of vibrating air. The string vibrations are augmented/amplified by the soundboard, back, and the air in the body of the guitar. Materials with a desired range of resonant frequencies are used to construct acoustic guitars and other acoustic string instruments. Wood is the most common material used to build these instruments. Various species of spruce, cedar, mahogany, rosewood, etc. provide the suite of resonant frequencies that produce the unique sound character produced by these instruments.

Acoustic guitars have robust resonances in the 100 Hz to 200 Hz range. In addition to the acoustic guitar soundboard and back vibration, air resonance occurs when the air within a body chamber vibrates to produce sound. Air resonance amplifies the frequencies of an excitation source that match the natural vibration characteristics of the chamber. In acoustic guitars, one of the lowest resonant frequencies is the result of air resonance. At resonant frequencies close to 100 Hz and 200 Hz, the soundboard and back vibrate in opposite directions, causing air to move in and out of the sound hole like a bellows. For one resonant frequency near 190 Hz, the soundboard and back are vibrating in the same direction. At some higher resonant frequencies, one half bends outward while the other half bends inward. Vibrations can be in-phase and/or out-of-phase. It is important that the guitar soundboard and back each be permitted to vibrate independently.

Like the strings of a guitar, speaker shell vibrations can be augmented to produce sound, using plates that function similarly to the soundboard and back of an acoustic guitar with a resonating air chamber. The use of a single (or multiple) plate(s) increases the surface area available for vibration, improving sound depth and volume by increasing the volume of vibrating air.

The speaker resonator base is made from a series of plates, preferably but not limited to circular shaped plates. There is a base plate and one or more resonator plates. Resonator and base plates are separated and held taut by placing spacers for each level at the perimeter of the plates. Spacers are preferably, but not limited to, cylindrical shapes. The space between plates creates an air resonance chamber.

Perimeter placement of plate spacers creates the largest uninterrupted, plate surface areas, allowing plates to vibrate independently from one another. F-holes (sound holes) can be added to adjust tone. As in acoustic guitars, horizontal bracing can be used to increase plate stiffness. Acoustic insulating pads/feet are added to the bottom of the base plate to minimize transmission (loss) of sound energy to the surface the speaker resonator base is placed on.

A further benefit of the designs disclosed herein is that the devices include an open side wall, which allows the chamber to provide a 360-degree sound distribution. In contrast, speakers or string instruments typically have one or sometimes two sound holes that only allow for directional sound.

The devices disclosed herein provide for minimized sound energy and quality lost to the surfaces speakers are placed on; conversion of speaker shell/box vibrations to desirable, audible sound frequencies; augmented depth, volume, frequency response, and quality of speaker sound through acoustic resonance; and additional timbre unique to instruments producing the sound through proper material selection. The various components of the speaker resonator base can be fastened, bonded together, or otherwise coupled to each other with screws, glue, epoxy etc.

Various implementations include a speaker resonator device. The device includes a base plate, one or more spacers, and a resonator plate. The base plate has a first base side and a second base side opposite and spaced apart from the first base side. The one or more spacers each have a first spacer end and a second spacer end opposite and spaced apart from the first spacer end. The second spacer end of each of the one or more spacers contacts the first base side. Each of the one or more spacers extends away from the first base side. The resonator plate has a first resonator side and a second resonator side opposite and spaced apart from the first resonator side. The second spacer end of each of the one or more spacers contacts the second resonator side. The first base side and the second resonator side are spaced apart from each other such that, when a speaker is disposed on the first resonator side, the sound from the speaker resonates in the space between the resonator plate and the base plate.

FIGS. 1A-1D show a speaker resonator device 100 according to one implementation. The device 100 includes a base plate 110, one or more vibration absorbent feet 120, one or more spacers 130, and a resonator plate 150.

The base plate 110 has a first base side 112 and a second base side 114 opposite and spaced apart from the first base side 112. The base plate 110 has a circular cross-section in a plane parallel to the first base side 112. However, in some implementations, the base plate can have any cross-sectional shape, such as an oval, a triangle, a rectangle, a square, a quadrilateral, a pentagon, an octagon, or any other regular or irregular closed shape.

The one or more vibration absorbent feet 120 are coupled to the second base side 114. The vibration absorbent feet 120 add stability to the device 100 while also limiting the amount of vibrations transferred from the speaker and device 100 to the surface on which the device 100 is placed. The device 100 shown in FIGS. 1A-1D includes three vibration absorbent feet 120, but in some implementations, the device can include any number of one or more vibration absorbent feet that are able to provide stability to the device.

The vibration absorbent feet 120 shown in FIGS. 1A-1D are placed on the second base side 114 adjacent to the perimeter of the base plate 110 to allow the maximum uninterrupted vibrating surface area of the base plate 110. However, in some implementations, the absorbent feet can be disposed anywhere along the second base side.

The vibration absorbent feet 120 can have a diameter in the range of 6 mm to 55 mm and a thickness in the range of 3 mm to 60 mm. The vibration absorbent feet 120 can be made from dense foam or other vibration and acoustic insulating/blocking materials. In some implementations, the vibration absorbent feet are adjustable to selectively change the amount of vibration transferred from the speaker and the device to the surface on which the device is placed. In some implementations, the vibration absorbent feet can have any desired diameter and any desired thickness.

The one or more spacers 130 each have a first spacer end 132 and a second spacer 134 end opposite and spaced apart from the first spacer end 132. Each of the spacers 130 has a longitudinal axis 136 extending from the first spacer end 132 to the second spacer end 134. Each of the spacers 130 has a circular cross-section in a plane perpendicular to the longitudinal axis 136, but in some implementations, the spacers can have any cross-sectional shape, such as an oval, a triangle, a rectangle, a square, a quadrilateral, a pentagon, an octagon, or any other regular or irregular closed shape.

Each of the spacers 130 has a largest width of 13 mm (0.5 inches). However, in some implementations, the largest width of each spacer is in the range of 6 mm-55 mm. In some implementations, the largest width of each spacer is in the range of 6 mm-80 mm. In some implementations, the largest width of each spacer can be any desired size.

Furthermore, each of the spacers 130 has a length, as measured from the first spacer end 132 to the second spacer end 134, of 6.5 mm (0.25 inches). However, in some implementations, the length is in the range of 1.5 inches to 1.75 inches. In some implementations, the length is in the range of 3 mm-155 mm. In some implementations, the length is in the range of 3 mm-460 mm. In some implementations, the length of each spacer can be any desired length.

The second spacer end 134 of each of the one or more spacers 130 is coupled to the first base side 112 such that the one or more spacers 130 extends away from the first base side 112. The device 100 shown in FIGS. 1A-1D includes three spacers 130 coupled to the first base side 112, but in some implementations, the device includes any number of one or more spacers. For example, the device could include one spacer such that the resonator plate is cantilevered from the one spacer. However, in preferred implementations, the device includes any number of three or more spacers. For the device 100 shown in FIGS. 1A-1D, each of the spacers 130 are circumferentially spaced apart from each other adjacent to a perimetrical edge of the base plate 110. This configuration provides for the largest possible uninterrupted open resonation surfaces of the base plate 110 and resonator plate 150. However, in some implementations, the spacers can be disposed anywhere along the first base side.

The resonator plate 150 has a first resonator side 152 and a second resonator side 154 opposite and spaced apart from the first resonator side 152. The resonator plate 150 has a circular cross-section in a plane parallel to the first resonator side 152. However, in some implementations, the resonator plate can have any cross-sectional shape, such as an oval, a triangle, a rectangle, a square, a quadrilateral, a pentagon, an octagon, or any other regular or irregular closed shape.

The first spacer end 132 of each of the one or more spacers 130 is coupled to the second resonator side 154. The spacers 130 space the first base side 112 and the second resonator side 154 apart from each other such that a resonator chamber 170 is defined between the base plate 110 and the resonator plate 150. The size of the spacers 130 can be chosen based on the sizes of the base plate 110 and the resonator plate 150 such that, when a speaker is disposed on the first resonator side 152, the sound from the speaker resonates in the resonator chamber 170, the resonator plate 150, and the base plate 110 at predetermined resonant frequencies. The relative sizes of the spacers 130, base plate 110, and resonator plate 150 can be altered to resonate the sound from the speaker at any desired frequencies.

The base plate 110, the resonator plate 150, and the spacers 130 of the device 100 shown in FIGS. 1A-1D are each made of wood, but in some implementations, the base plate, the resonator plate, and/or the spacers can be made of ceramics, plastics, composites, fibers, metals, or any material that is rigid enough to reverberate sound from the speaker in the space between the base plate and the resonator plate in the resonator chamber. As discussed above, adjustments in the relative dimensions of the base plate 110, the resonator plate 150, and the spacers 130 may need to be adjusted to account for the rigidity and density of the different materials being used.

The base plate 110 has a thickness as measured from the first base side 112 to the second base side 114, and the resonator plate 150 has a thickness as measured from the first resonator side 152 to the second resonator side 154. The thicknesses of the base plate 110 and the resonator plate 150 shown in FIGS. 1A-1D are both 3 mm (0.125 inches), but in some implementations, the thicknesses of the base plate and/or the resonator plate can be in the range of 1 mm-50 mm. In some implementations, the thicknesses of the base plate and/or the resonator plate can be about 0.25 inches. Although the thickness of the base plate 110 shown in FIGS. 1A-1D is the same as the thickness of the resonator plate 150, in some implementations, the thickness of the base plate is different than the thickness of the resonator plate. In some implementations, the base plate can have any desired thickness. In some implementations, the resonator plate can have any desired thickness.

Furthermore, the base plate 110 has a largest width, and the resonator plate 150 has a largest width. The largest width (i.e., diameter) of the base plate 110 and the resonator plate 150 shown in FIGS. 1A-1D are both 22.9 cm (9 inches), but in some implementations, the widths of the base plate and/or the resonator plate can be in the range of 10 cm-60 cm. In some implementations, the widths of the base plate and/or the resonator plate can be in the range of 10 cm-95 cm. Although the largest width of the base plate 110 shown in FIGS. 1A-1D is the same as the largest width of the resonator plate 150, in some implementations, the largest width of the base plate is different than the largest width of the resonator plate. In some implementations, the base plate can have any desired largest width. In some implementations, the resonator plate can have any desired largest width.

Figure 3A:
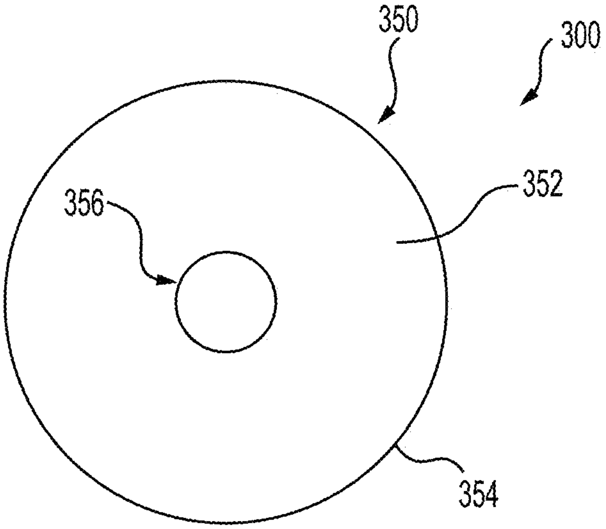
FIGS. 3A-3E are top views of resonator plates of a speaker resonator device similar to the speaker resonator device of FIG. 1A, but defining one or more sound holes.
Figure 3B:
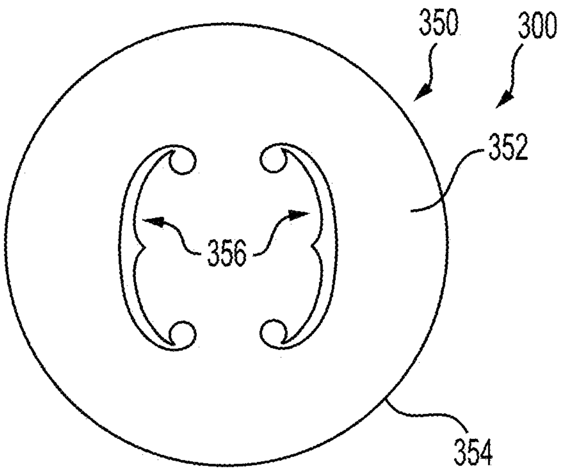
Figure 3C:
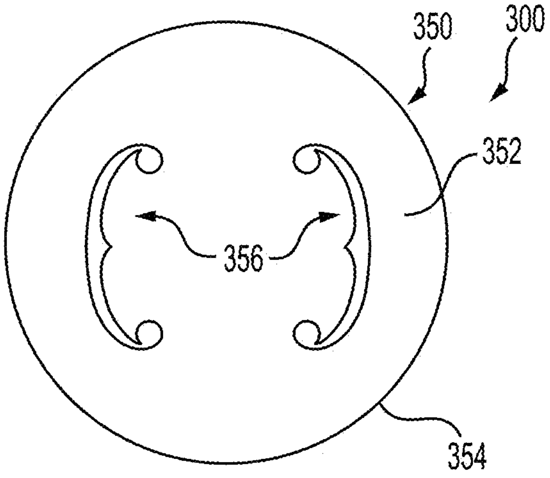
Figure 3D:
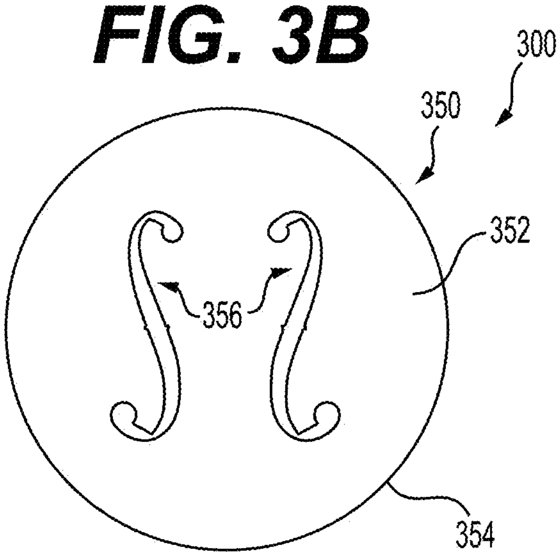
Figure 3E:
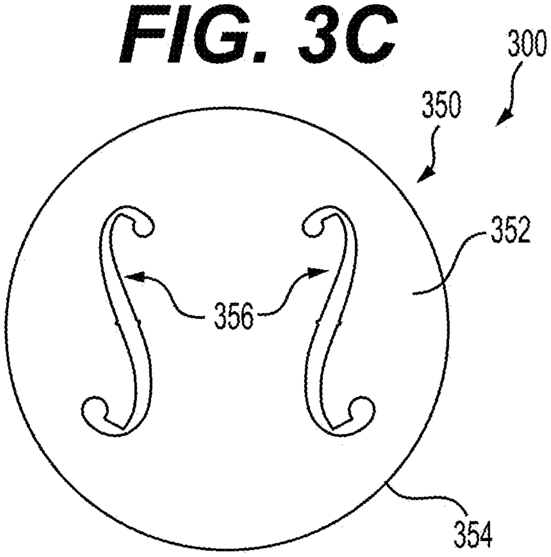

FIGS. 3A-3E show another implementation of a device 300 similar to the device 100 shown in FIGS. 1A-1D. Thus, similar reference numbers are used in FIGS. 3A-3E as are used in FIGS. 1A-1D to denote similar features in FIGS. 3A-3E. However, the first resonator side 352 of the resonator plate 350 of the device 300 shown in FIGS. 3A-3E defines one or more sound holes 356 each extending to the second resonator side 354. The sound hole 356 shown in FIG. 3A is a central opening, the sound holes 356 shown in FIGS. 3B and 3C are C-holes, and the sound holes 356 shown in FIGS. 3D and 3E are F-holes. Each type of sound hole 356 shown in FIGS. 3A-3E can be used to adjust the tone of the device 300. Although the devices 300 shown in FIGS. 3A-3E include one or two sound holes 356 each, in some implementations, the first resonator side of the resonator plate defines any number of one or more sound holes disposed in any position on the first resonator side. In some implementations, the sound holes can be any shape or size. In some implementations, the sound hole(s) described herein can be defined by the first base side of the base plate and extend to the second base side of the base plate.

Figure 4A:
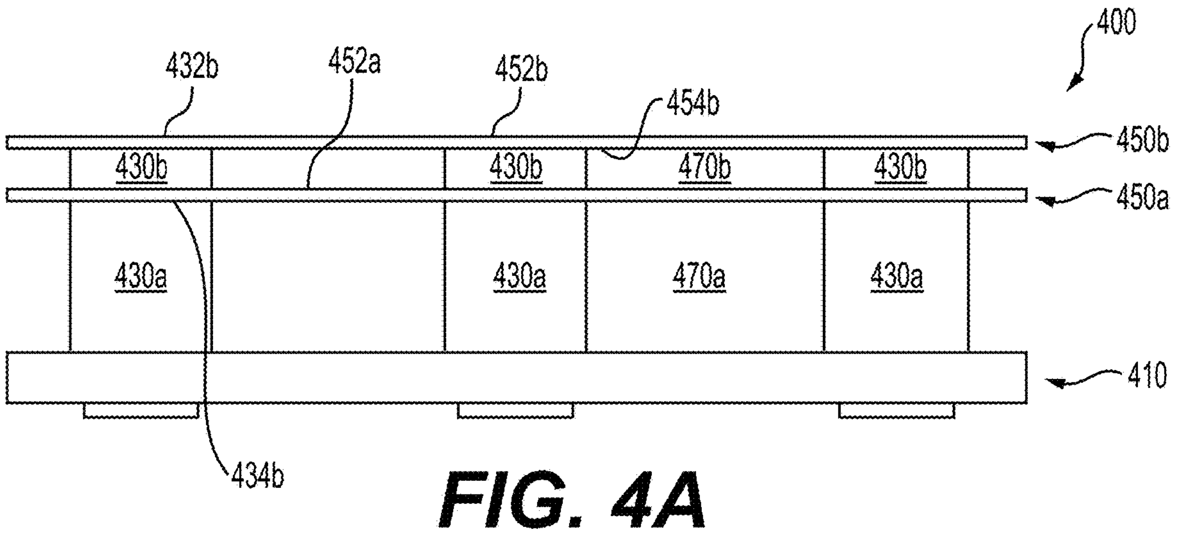
FIG. 4A is a side view of a speaker resonator device, according to another implementation.
Figure 4B:
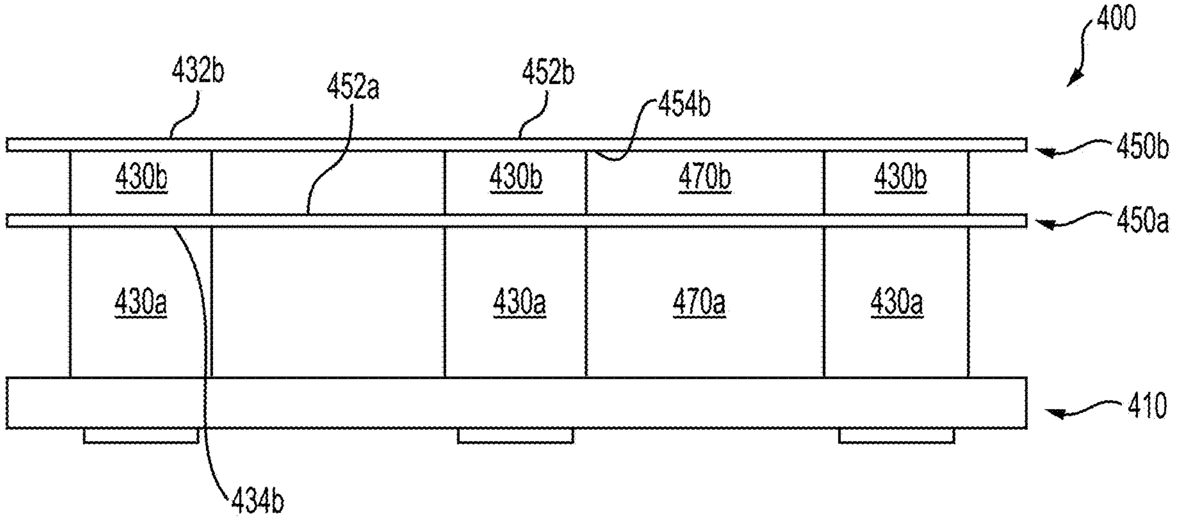
FIG. 4B is a side view of a speaker resonator device, according to another implementation similar to the device of FIG. 4A.
Figure 4C:
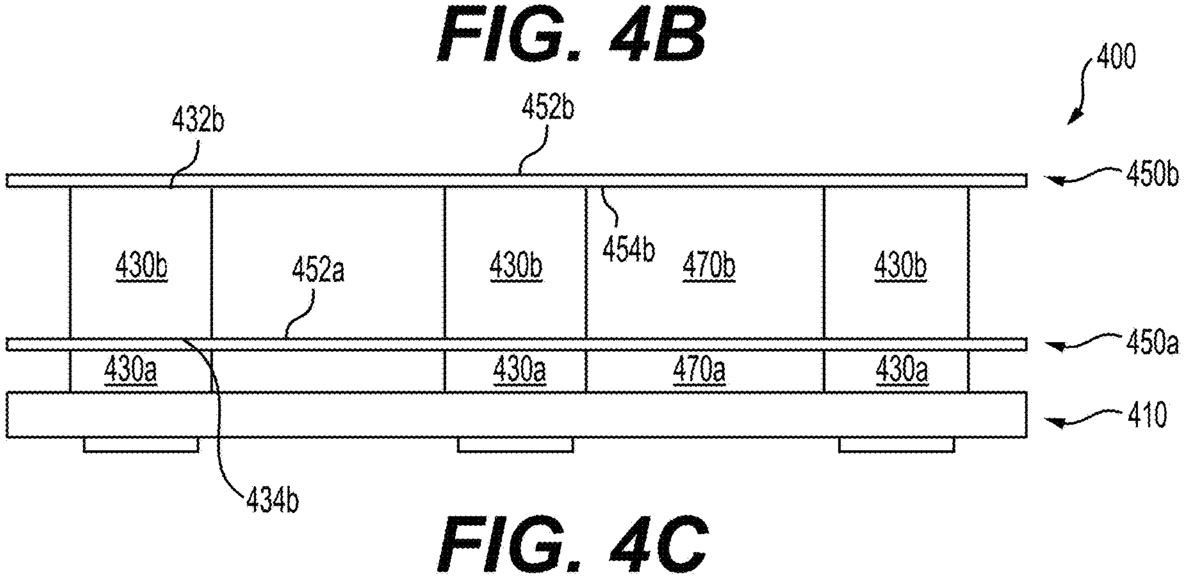
FIG. 4C is a side view of a speaker resonator device, according to another implementation similar to the device of FIG. 4A.

FIGS. 4A-4C show another device 400 similar to the device 100 shown in FIGS. 1A-1D. Thus, similar reference numbers are used in FIGS. 4A-4C as are used in FIGS. 1A-1D to denote similar features in FIGS. 4A-4C. However, the resonator plate of the device 400 shown in FIGS. 4A-4C is a first resonator plate **450*a*, and the one or more spacers is a first set of one or more spacers 430*a*. The device 400 shown in FIGS. 4A-4C further includes a second set of one or more spacers 430*b* and a second resonator plate 450*b***.

Like the spacers of the first set of one or more spacers **430*a*, the second set of one or more spacers 430*b* each have a first spacer end 432*b* and a second spacer end 434*b* opposite and spaced apart from their first spacer end 432*b*. The second spacer end 434*b* of each spacer of the second set of one or more spacers 430*b* is coupled to the first resonator side 452*a* of the first resonator plate 450*a* such that each of the spacers of the second set of one or more spacers 430*b* extends away from the first resonator side 452*a* of the first resonator plate 450*a*. The spacers of the second set of one or more spacers 430*b* can have any of the features described above with reference to the one or more spacers 130, 230 in other implementations. Also, the second set of one or more spacers 430*b* can include any of the same features as, or include different features from, the first set of one or more spacers 430*a***.

The second resonator plate **450*b* has a first resonator side 452*b* and a second resonator side 454*b* opposite and spaced apart from its first resonator side 452*b*. The second spacer end 434*b* of each of the spacers of the second set of one or more spacers 430*b* is coupled to the second resonator side 454*b* of the second resonator plate 450*b***.

The second resonator plate **450*b* can have any of the features described above with reference to the resonator plates 150, 250, 350 in other implementations. Also, the second resonator plate 450*b* can include any of the same features as, or include different features from, the first resonator plate 450*a***.

The second set of one or more spacers **430*b* space the first resonator side 452*a* of the first resonator plate 450*a* and the second resonator side 454*b* of the second resonator plate 450*b* apart from each other such that a second resonator chamber 470*b* is defined between the first resonator plate 450*a* and the second resonator plate 450*b*. Thus, the device 400 includes a first resonator chamber 470*a* and a second resonator chamber 470*b*. The size of the spacers of the second set of one or more spacers 430*b* can be chosen based on the sizes of the first resonator plate 450*a* and the second resonator plate 450*b* such that, when a speaker is disposed on the first resonator side 452*b* of the second resonator plate 450*b*, the sound from the speaker resonates in the second resonator chamber 470*b*, the first resonator plate 450*a*, and the second resonator plate 450*b* at predetermined resonant frequencies. The relative sizes of the base plate 410, first resonator plate 450*a*, second resonator plate 450*b*, first set of one or more spacers 430*a*, and second set of one or more spacers 430***b* can be altered to resonate the sound from the speaker at any desired frequencies. In some implementations, the predetermined resonant frequencies of the first resonant chamber and the second resonant chamber are different. In some implementations, the predetermined resonant frequencies of the first resonant chamber and the second resonant chamber are the same.

Figure 5A:
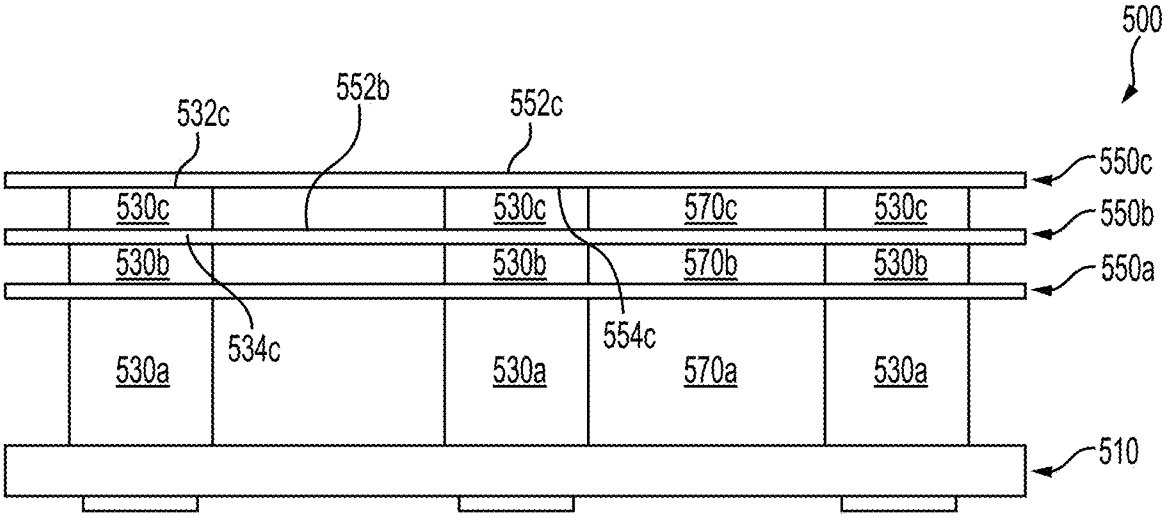
FIG. 5A is a side view of a speaker resonator device, according to another implementation.
Figure 5B:
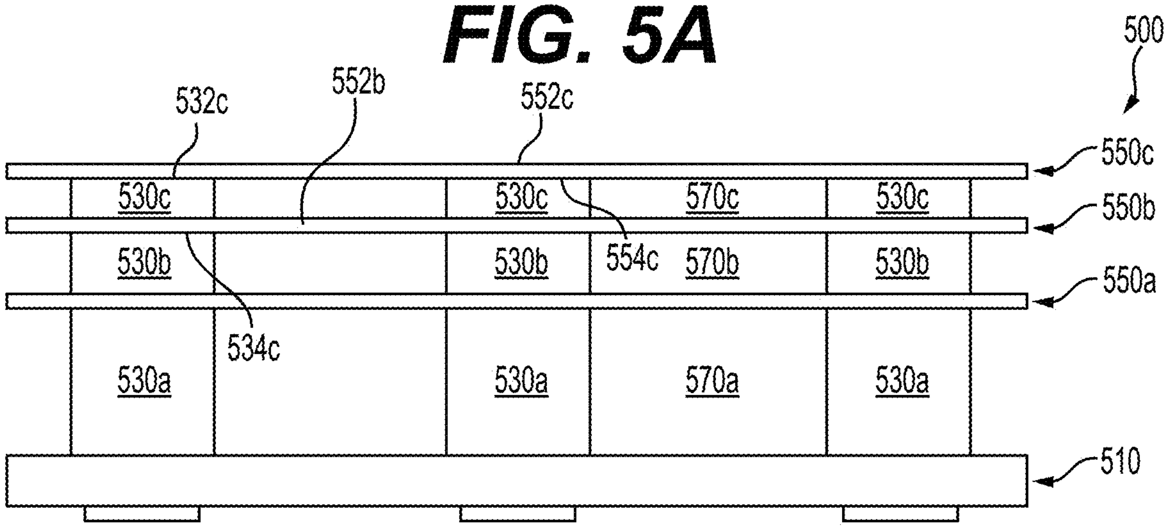
FIG. 5B is a side view of a speaker resonator device, according to another implementation similar to the device of FIG. 5A.
Figure 5C:
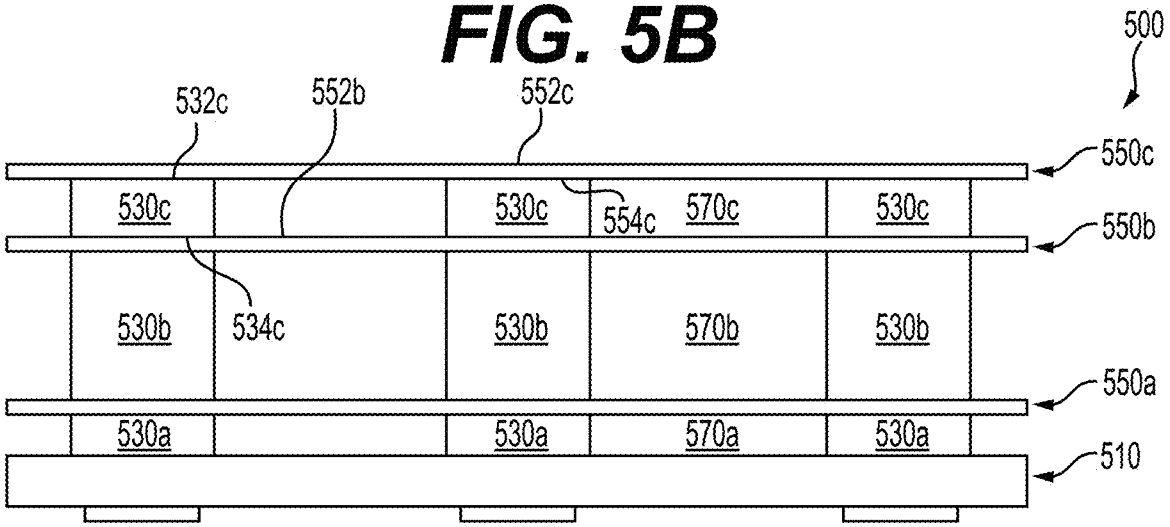
FIG. 5C is a side view of a speaker resonator device, according to another implementation similar to the device of FIG. 5A.

FIGS. 5A-5C show another device 500 similar to the device 400 shown in FIGS. 4A-4C. Thus, similar reference numbers are used in FIGS. 5A-5C as are used in FIGS. 4A-4C to denote similar features in FIGS. 5A-5C. However, the device 500 shown in FIGS. 5A-5C further includes a third set of one or more spacers 530*c* and a third resonator plate 550*c*.

Like the spacers of the first and second sets of one or more spacers 530*a*, 530*b*, the third set of one or more spacers 530*c* each have a first spacer end 532*c* and a second spacer end 534*c* opposite and spaced apart from their first spacer end 532*c*. The second spacer end 534*c* of each spacer of the third set of one or more spacers 530*c* is coupled to the first resonator side 552*b* of the second resonator plate 550*b* such that each of the spacers of the third set of one or more spacers 530*c* extends away from the first resonator side 552*b* of the second resonator plate 550*b*. The spacers of the third set of one or more spacers 530*c* can have any of the features described above with reference to the one or more spacers 130, 230, 430*a*, 430*b* in other implementations. Also, the third set of one or more spacers 530*c* can include any of the same features as, or include different features from, the first and second sets of one or more spacers 530*a*, 530*b*.

The third resonator plate 550*c* has a first resonator side 552*c* and a second resonator side 554*c* opposite and spaced apart from its first resonator side 552*c*. The second spacer end 534*c* of each of the spacers of the third set of one or more spacers 530*c* is coupled to the second resonator side 554*c* of the third resonator plate 550*c*.

The third resonator plate 550*c* can have any of the features described above with reference to the resonator plates 150, 250, 350, 450*a*, 450*b* in other implementations. Also, the third resonator plate 550*c* can include any of the same features as, or include different features from, the first and second resonator plates 550*a*, 550*b*.

The third set of one or more spacers 530*c* space the first resonator side 552*b* of the second resonator plate 550*b* and the second resonator side 554*c* of the third resonator plate 550*c* apart from each other such that a third resonator chamber 570*c* is defined between the second resonator plate 550*b* and the third resonator plate 550*c*. Thus, the device 500 includes a first resonator chamber 570*a*, a second resonator chamber 570*b*, and a third resonator chamber 570*c*. The size of the spacers of the third set of one or more spacers 530*c* can be chosen based on the sizes of the second resonator plate 550*b* and the third resonator plate 550*c* such that, when a speaker is disposed on the first resonator side 552*c* of the third resonator plate 550*c*, the sound from the speaker resonates in the third resonator chamber 570*c*, the second resonator plate 550*b*, and the third resonator plate 550*c* at predetermined resonant frequencies. The relative sizes of the base plate 510, first resonator plate 550*a*, second resonator plate 550*b*, third resonator plate 550*c*, first set of one or more spacers 530*a*, second set of one or more spacers 530*b*, and third set of one or more spacers 530*c* can be altered to resonate the sound from the speaker at any desired frequencies. In some implementations, the predetermined resonant frequencies of the first resonant chamber, the second resonant chamber, and the third resonant chamber are different. In some implementations, the predetermined resonant frequencies of the first resonant chamber, the second resonant chamber, and the third resonant chamber are the same as one or both of the other resonant chambers.

In some implementations, the device includes any number of resonator plates and sets of spacers to define any number of resonator chambers.

Figure 2A:
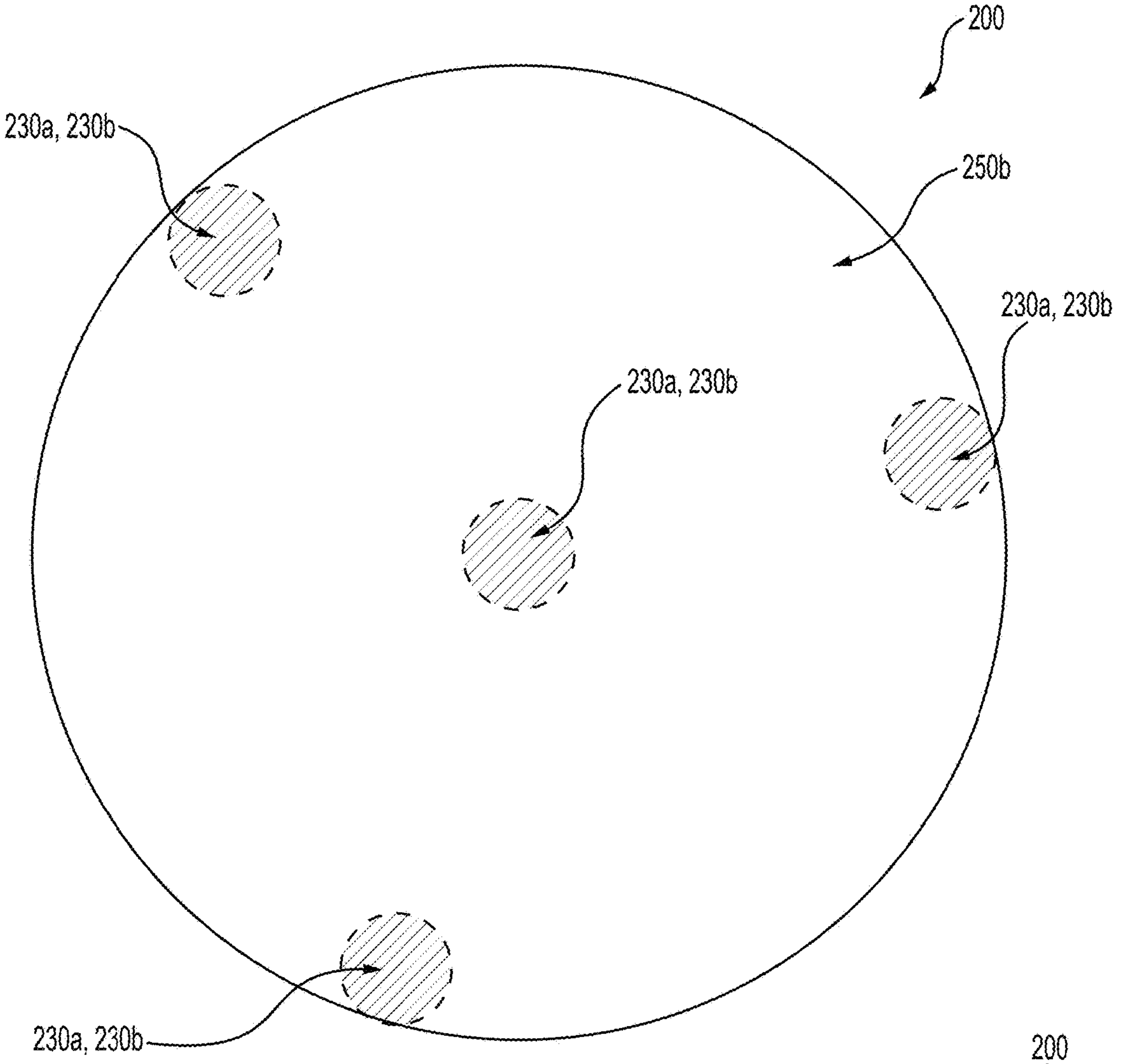
FIG. 2A is a top view of a speaker resonator device, according to another implementation.
Figure 2B:
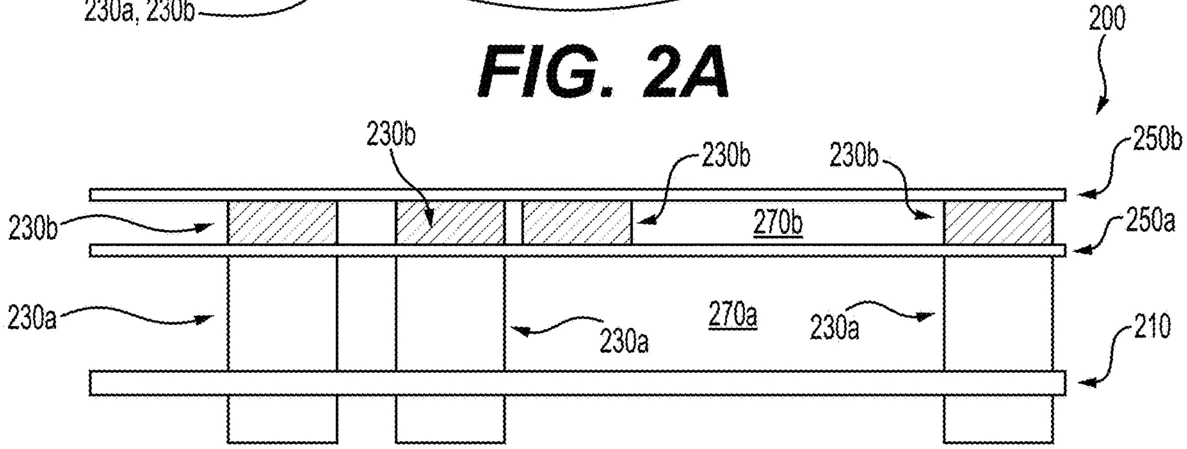
FIG. 2B is a side view of the speaker resonator device of FIG. 2A.

For example, FIGS. 2A and 2B show another implementation of a device 200 similar to the device 100 shown in FIGS. 4A-4C. Thus, similar reference numbers are used in FIGS. 2A and 2B as are used in FIGS. 4A-4C to denote similar features in FIGS. 2A and 2B. The device 200 includes a first set of one or more spacers 230*a* extending between the base plate 210 and the first resonator plate 250*a* and a second set of one or more spacers 230*b* extending between the first resonator plate 250*a* and the second resonator plate 250*b*.

However, the second set of one or more spacers 230*b* of the device 200 shown in FIGS. 2A and 2B includes a centrally located spacer 230*b*. The centrally located spacer 230*b* joins the center portions of the adjacent resonator plates 250*a*, 250*b* so that they vibrate in unison and oscillate in the same direction simultaneously. Because adjacent plates tend to vibrate and oscillate in opposite directions, the sound waves coming from adjacent resonator chambers 270*a*, 270*b* are 180 degrees out of sync with each other and can cancel each other through destructive wave interference. By coupling the adjacent resonator plates 250*a*, 250*b* so that they vibrate in unison and oscillate in the same direction simultaneously, it ensures that the second resonator plate 250*b* moves with the first resonator plate 250*a* and opposite the base plate such that both resonator chambers 270*a*, 270*b* and the base plate 210, first resonator plate 250*a*, and the second resonator plate 250*b* all produce sound waves that are in sync with each other. The feature shown in FIGS. 2A and 2B can be incorporated between any adjacent plates of any of the implementations disclosed herein. Also, one or more sets of any adjacent plates can be coupled to each other by a central spacer.

Although the spacers 430*a*, 430*b*, 530*a*, 530*b*, 530*c* shown in the devices 400, 500 of FIGS. 4A-4C and FIGS. 5A-5C extend between adjacent base plates 410, 510 and resonator plates 450*a*, 450*b*, 550*a*, 550*b*, 550*c*, in some implementations, the first resonant side of one or more of the resonator plates defines one or more spacer openings (not shown) extending to the second resonator side of the respective resonator plate. In such implementations, the device includes only one set of one or more spacers, and one or more intermediate spacer portions of each of the spacers extends through a different one of the one or more spacer openings to couple these resonator plates to the one or more spacers. Thus, the one set of one or more spacers would couple the base plate to the furthest-most resonator plate, along with any intermediate resonator plates. In some implementations, the one or more spacers extend along the perimetrical edge of the plates, and the perimetrical edges of the plates are coupled to the spacers.

FIGS. 6A-10B show other implementations of speaker resonator devices 600, 700, 800, 900, 1000. The speaker resonator devices shown in FIGS. 6A-10B are similar to the speaker resonator devices shown in FIGS. 1-5C, but the speaker resonator devices shown in FIGS. 6A-10B include an outer ring and the spacers are not coupled to one of the base plate or the resonator plate at one end.

The second spacer end 134 of each of the spacers 130 shown in FIGS. 1-5C are coupled to the first base side 112, and the first spacer end 132 of each of the spacers 130 is coupled to the second resonator side 154. However, in each of the implementations shown in FIGS. 6A-10B, one of the first spacer end 632 or the second spacer end 634 only contacts the second resonator side 654 or the first base side 612, respectively.

As shown in the devices 600, 700 in FIGS. 6A-7B the first spacer end 632, 732 can include a felt pad 638, 738, and the felt pad 638, 738 can contact the second resonator side 654, 754. The felt pads 638, 738 act similarly to the felt pads between the bars and the base of a xylophone to vibrationally isolate the resonator plate 650, 750 from the base plate 610, 710. However, in some implementations, such as the devices 800, 900 shown in FIGS. 8-9C, the second spacer end 834, 934 of each spacer 830, 930 can include the felt pads 838, 938. In such implementations, the first spacer end 832, 932 is coupled to the second resonator side 854, 954 and the felt pads 838, 938 of the second spacer end 834, 934 contacts the first base side 812, **816*b*, 912**.

Figure 8A:
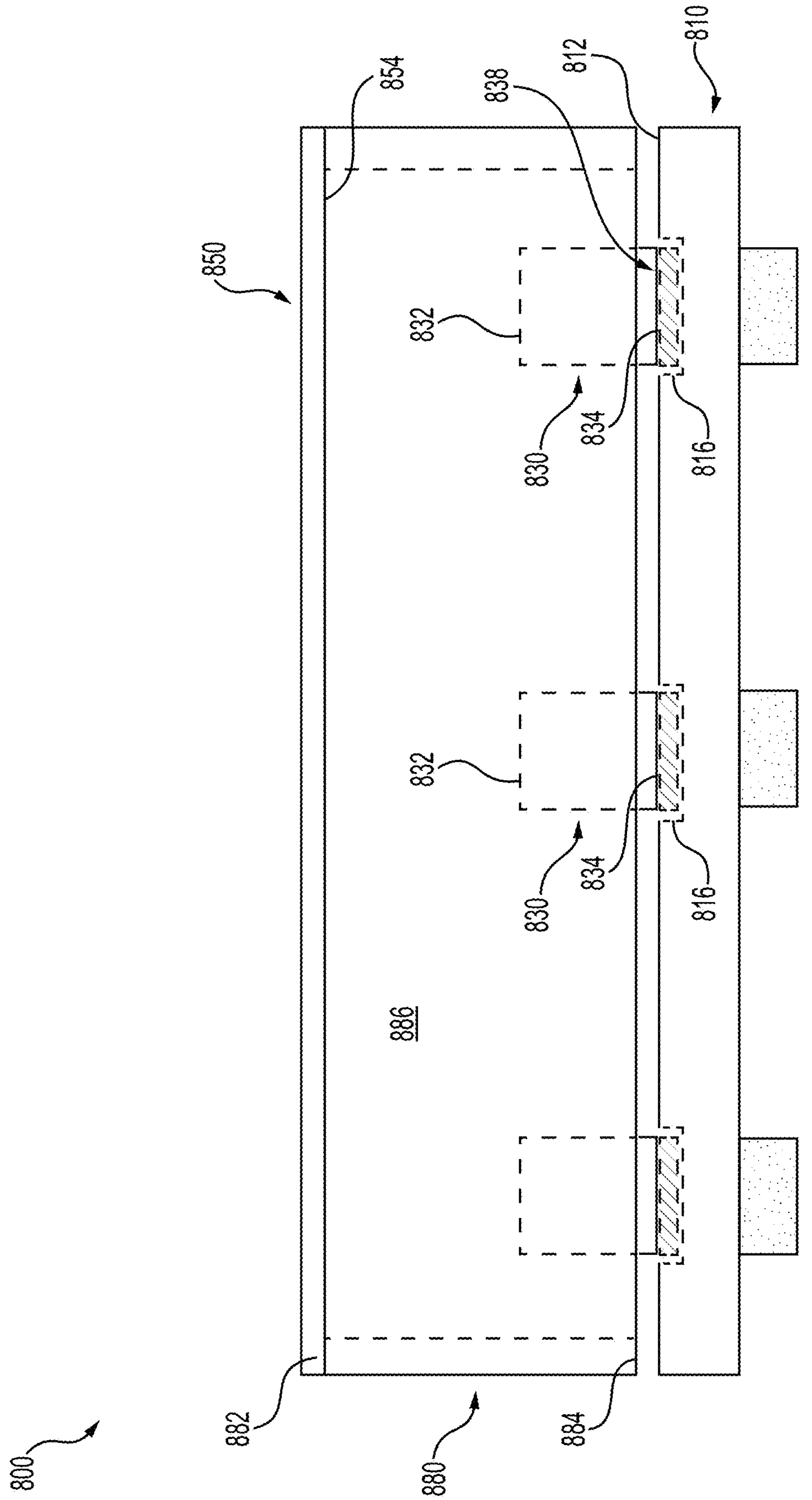
FIG. 8A is a side view of a speaker resonator device, according to another implementation.
Figure 8B:
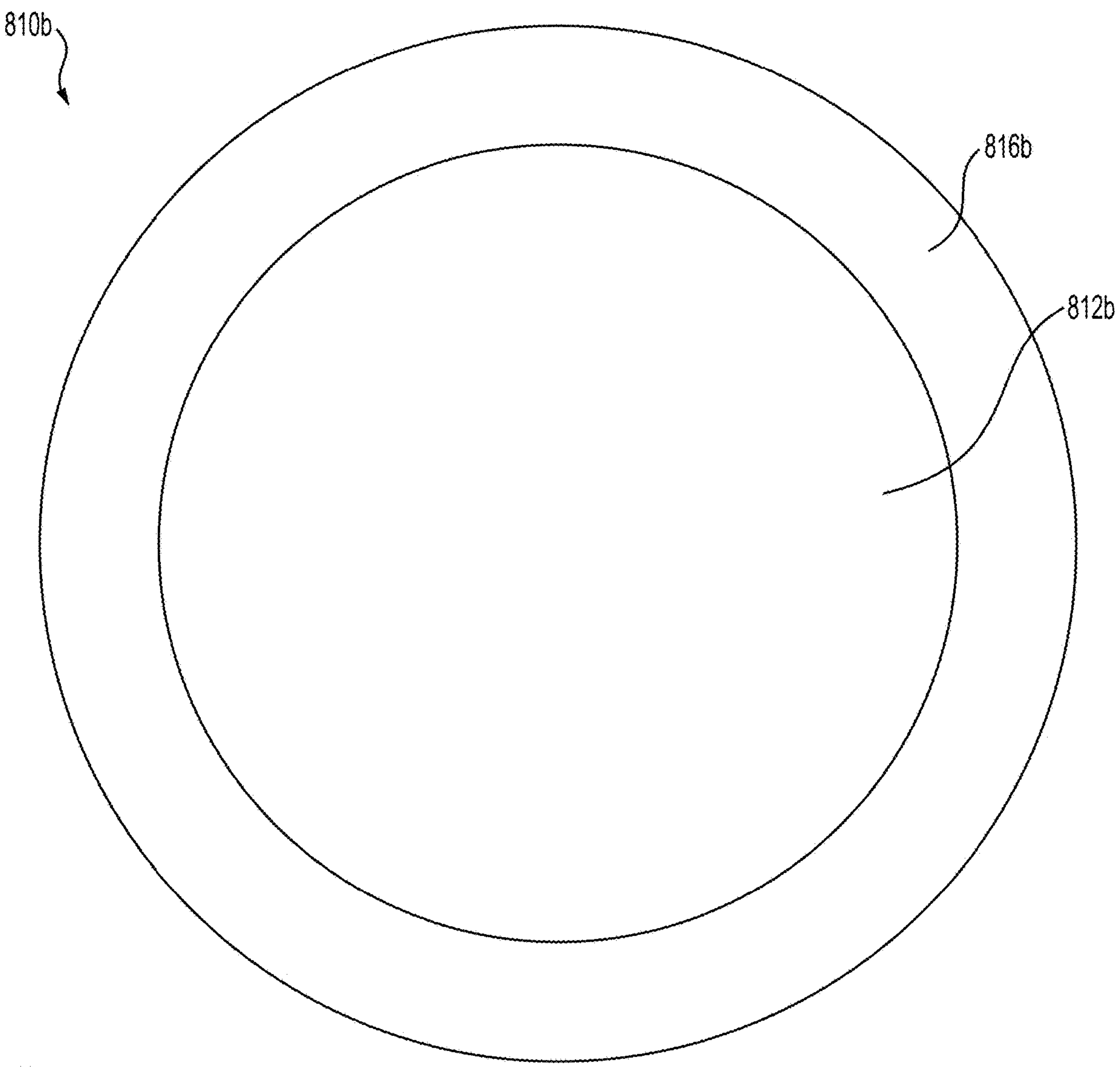
FIG. 8B is a top view of a base plate of a speaker resonator device, according to another implementation.
Figure 8C:
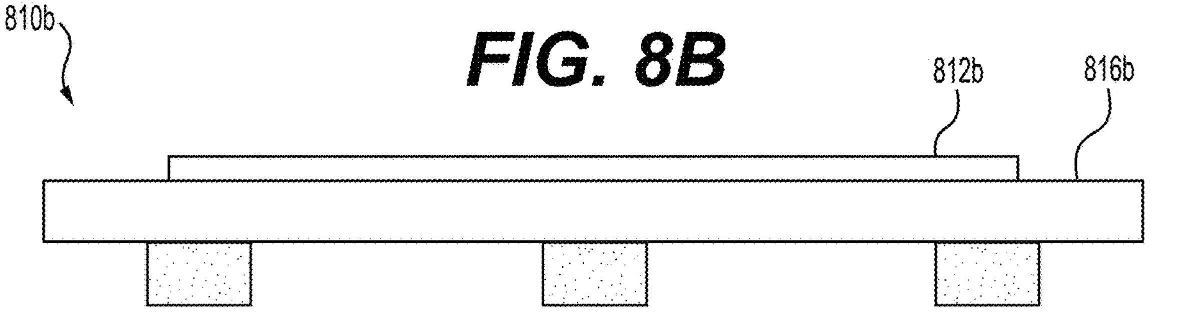
FIG. 8C is a side view of the base plate of FIG. 8B.
Figure 8D:
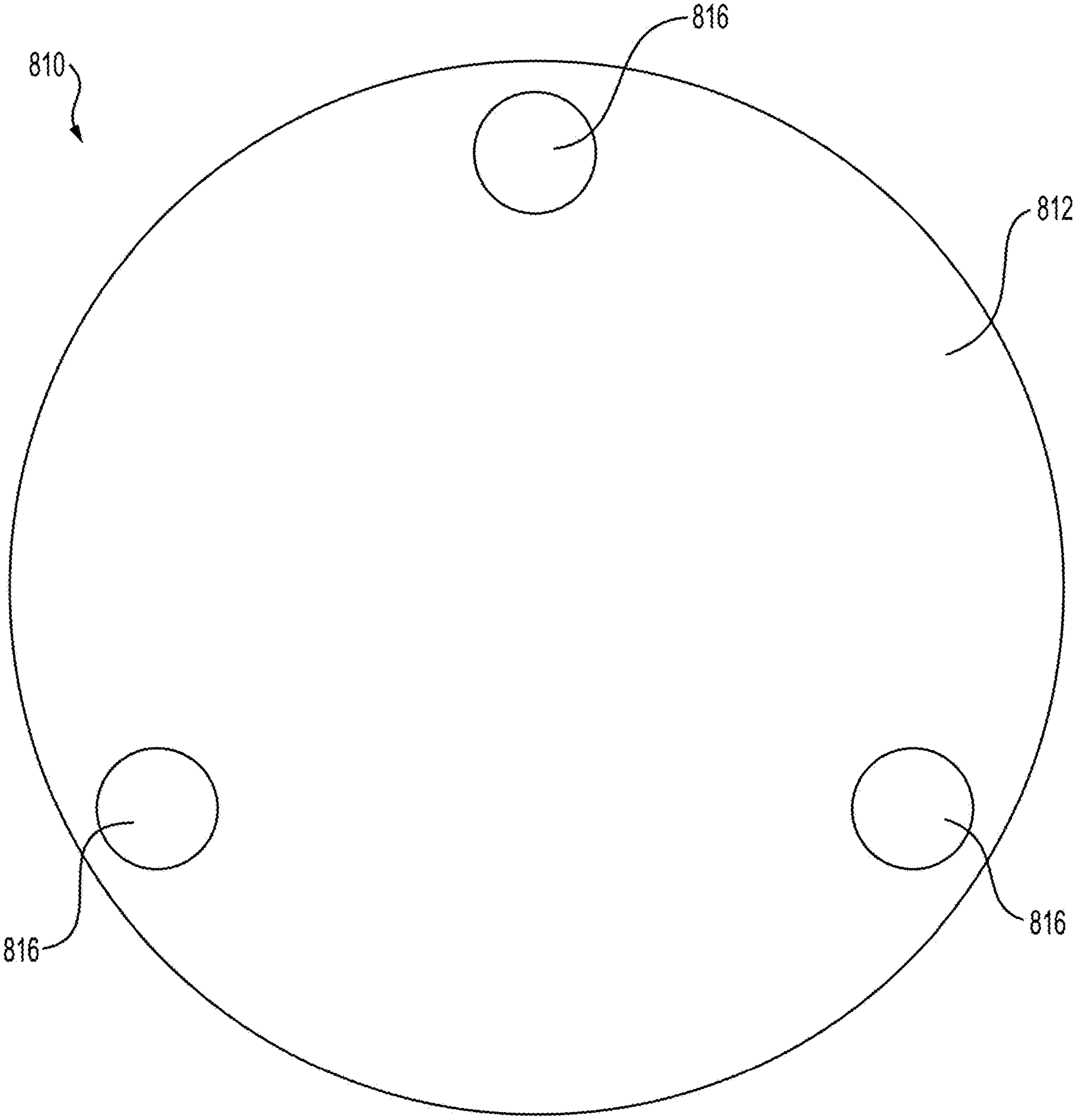
FIG. 8D is a top view of the base plate of FIG. 8A.
Figure 8E:
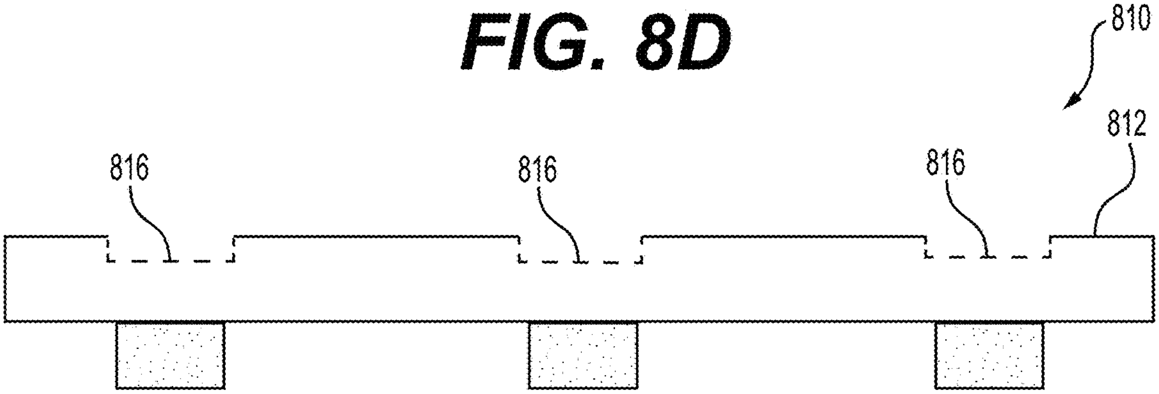
FIG. 8E is a side view of the base plate of FIG. 8A.

In some implementations, either the first base side or the second resonator side defines one or more channels or recesses. For implementations in which the first base side 812 defines one or more channels or recesses 816, such as the device 800 shown in FIG. 8A, the second spacer end 834 of each of the spacers 830 is disposed within the channel or recess 816 to retain the spacers 830 and prevent the resonator plate 850 from moving relative to the base plate 810. FIGS. 8D and 8E show the base of FIG. 8A by itself. As shown for the base 810 in FIGS. 8D and 8E, the channels or recesses 816 of this implementation are circular and are each sized to receive one of the felt pads 838 of the second spacer ends 843 of the spacers 830, as shown in FIG. 8A.

For implementations in which the second resonator side defines one or more channels, the first spacer end or each of the spacers is disposed within the channel to retain the spacers and prevent the resonator plate from moving relative to the base plate. If the first spacer ends include felt pads, then the felt pads are disposed within the one or more channels. The channel can be a single channel, such as a circle, such that all of the spacers can be disposed in the same channel, or there can be multiple channels, and one or more spacers can be disposed within each of the channels. For example, FIGS. 8B-8C show another implementation of a base plate **810*b* in which the channel 816*b* is defined around the outer perimeter of the first base side 812*b* for retaining the second spacer ends of the spacers, similar to the base plate 810 of the device 800 shown in FIG. 8A. The base plates 810, 810*b* shown in FIGS. 8A-8C can be combined with any of the resonator plates 950 shown with the devices 900 shown in FIGS. 9A-9C**.

Still, in some implementations, either the first base side or the second resonator side can include one or more felt pads that contacts the second spacer end or the first spacer end of each of the one or more spacers, respectively. If the first base side or the second resonator side defines one or more channels, a felt pad can be disposed within each of the channels such that an end of the spacer contacts the felt pad of the base plate or the resonator plate. However, in some implementations, the base plate and resonator plate do not define channels, and the felt pad is disposed on the first base side or the second resonator side, respectively.

FIGS. 6A-10B each show implementations of devices 600, 700, 800, 900, 1000 including outer rings 680, 780, 880, 980, 1080. The outer ring 680, 780, 880, 980, 1080 has a first ring end 682, 782, 882, 982, 1082 and a second ring end 684, 784, 884, 984, 1084 opposite and spaced apart from the first ring end 682, 782, 882, 982, 1082. The first ring end 682, 782, 882, 982, 1082 is coupled to and extends from the second resonator side 654, 754, 854, 954, 1054 toward the first base side 612, 712, 812, 912, 1012. An outwardly facing surface 686, 786, 886, 986, 1086 of the outer ring 680, 780, 880, 980, 1080 is flush with a perimetrical edge of the resonator plate 650, 750, 850, 950, 1050, but in some implementations, the outer ring is sized and positioned anywhere on the second resonator side.

The outer ring can be any desired length, as measured from the first ring end to the second ring end. For example, the outer ring 680 shown in FIGS. 6A-6B extends only a short distance from the second resonator side 654. However, even a relatively short length of the outer ring 680 provides rigidity to the resonator plate 650. The rigidity can provide for more even vibrations in the resonator plate 650, which can result in better sound.

Figure 6A:
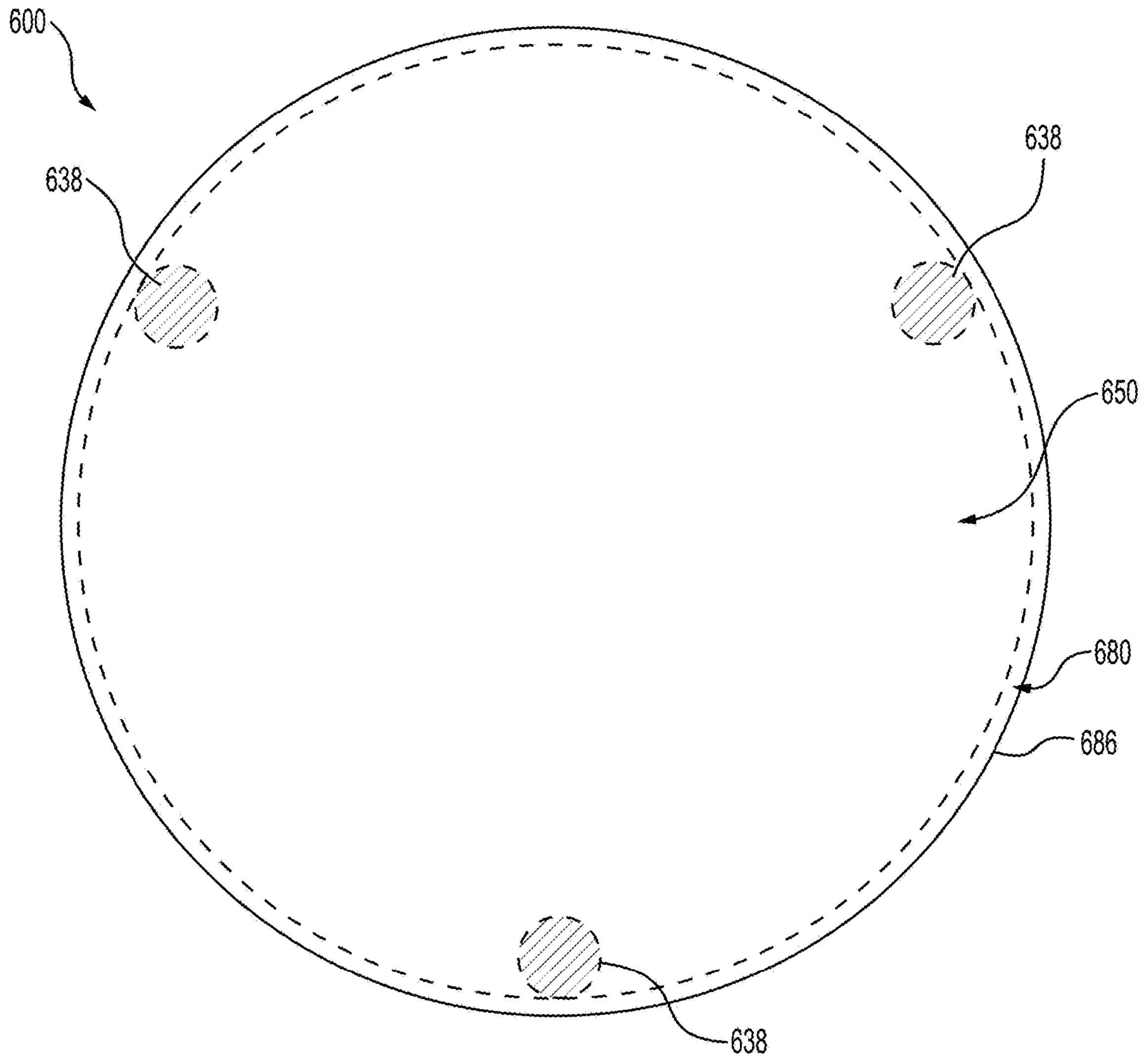
FIG. 6A is a top view of a speaker resonator device, according to another implementation.
Figure 6B:
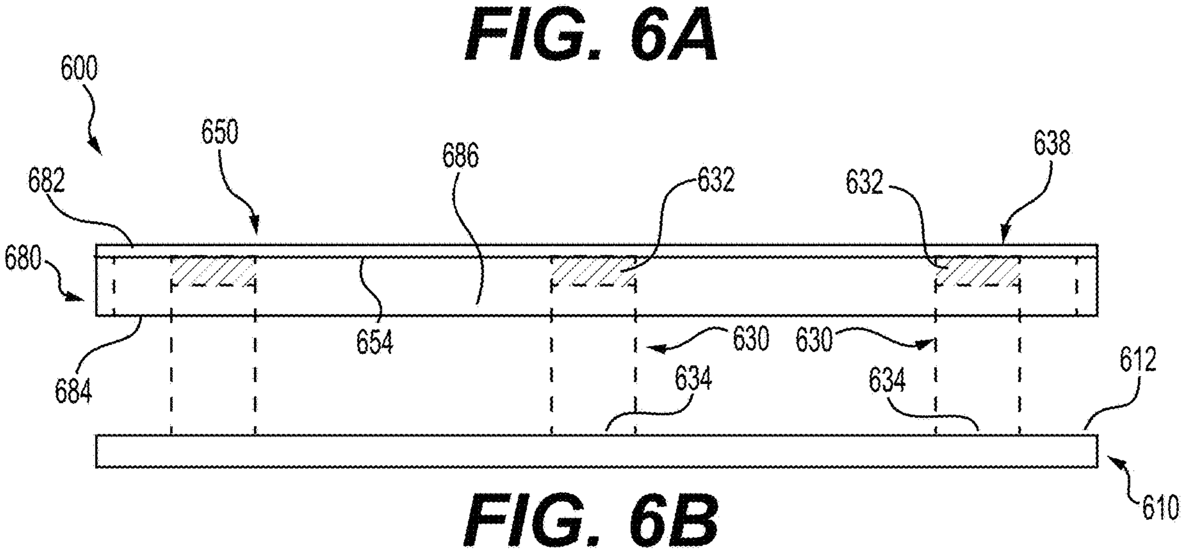
FIG. 6B is a side view of the speaker resonator device of FIG. 6A.
Figure 7A:
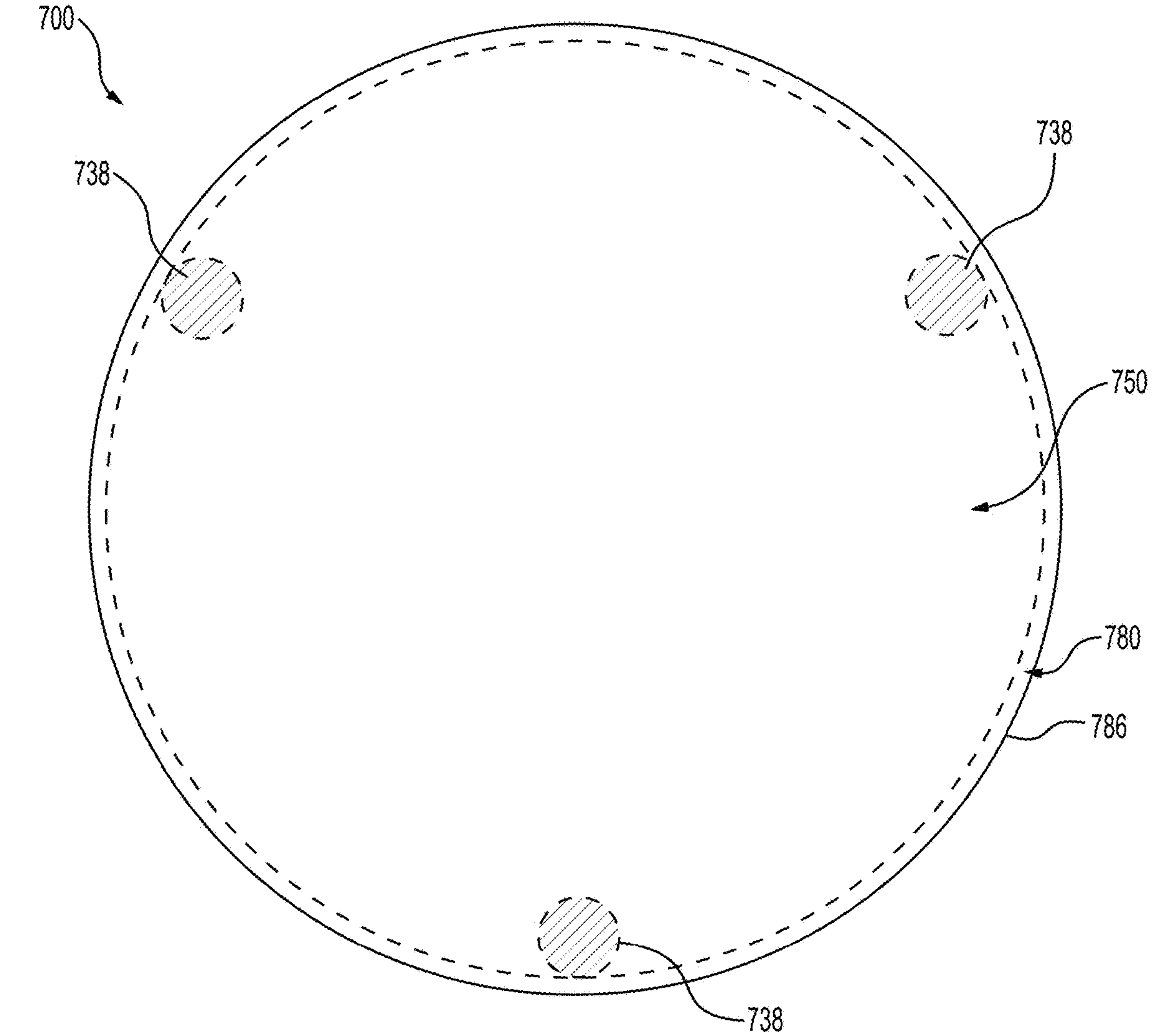
FIG. 7A is a top view of a speaker resonator device, according to another implementation.
Figure 7B:
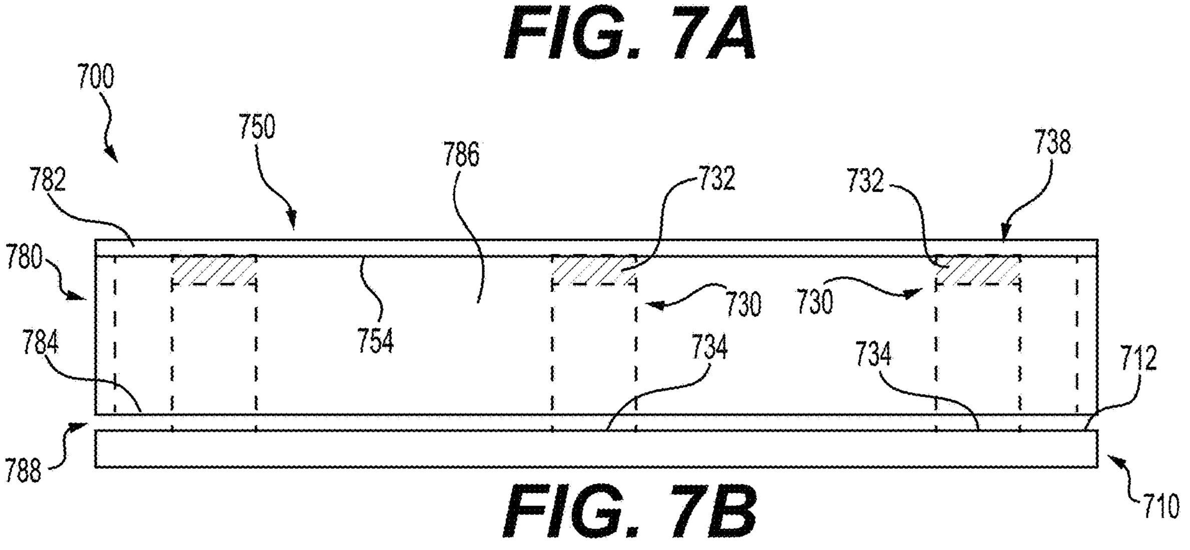
FIG. 7B is a side view of the speaker resonator device of FIG. 6A.
Figure 9A:
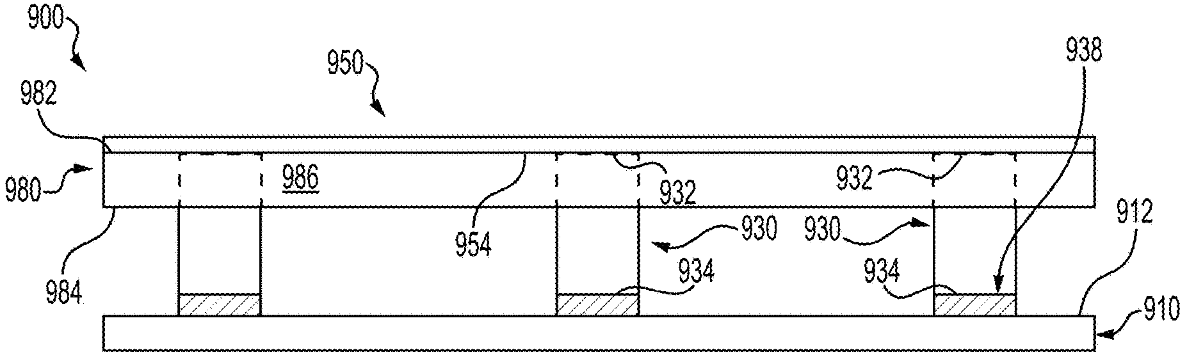
FIG. 9A is a side view of a speaker resonator device, according to another implementation.
Figure 9B:
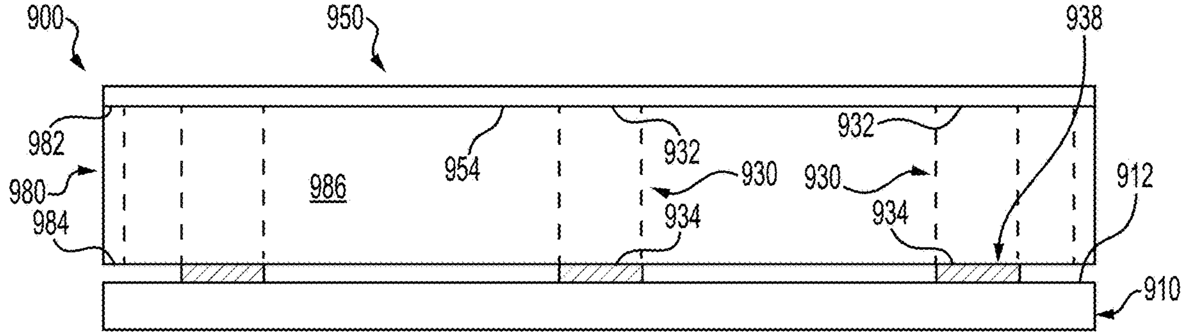
FIG. 9B is a side view of a speaker resonator device, according to another implementation.
Figure 9C:
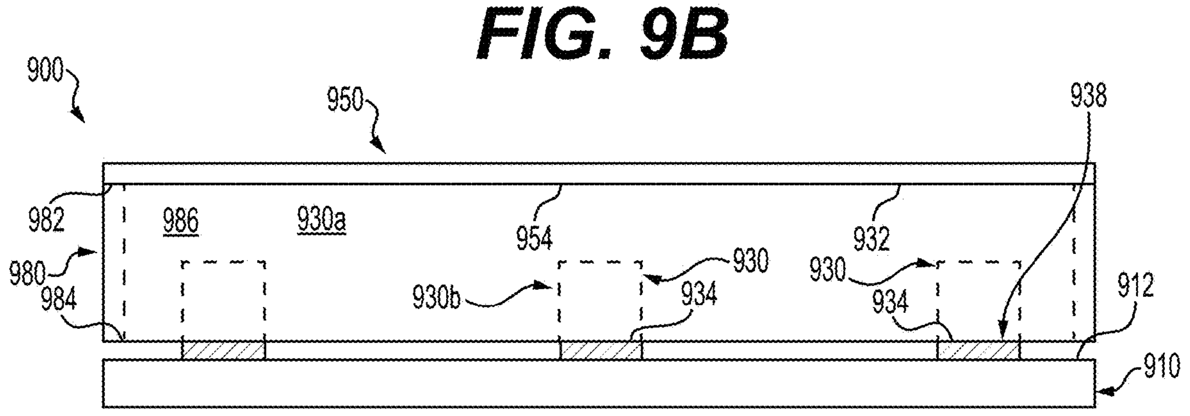
FIG. 9C is a side view of a speaker resonator device, according to another implementation.

The outer ring 780 shown in FIGS. 7A-7B has a longer length than the outer ring 680 shown in FIG. 6A-6B. The outer ring 780 shown in FIG. 7A-7B defines an annular gap 788 between the first base side 712 and the second ring end 784. The gap 788 shown in FIG. 7A-7B is ⅛-inch, but in some implementations, the gap can be any size, for example, between 3 mm and 4.5 mm. The gap 788 can act as a sound hole for the device 700. Various lengths of outer rings are contemplated herein, as shown in the implementations of FIGS. 9A-9C.

The outer ring 680 also has a width as measured between the outer surface 686 and an inner surface of the outer ring 680. For example, the width of the outer ring 680 shown in FIGS. 6A-6B is about 0.25 inches. However, in some implementations, the width of the outer ring can be any desired size. In some implementations, the outer ring can have a variable width along the length of the outer ring such that the outer ring has two or more widths.

As shown in FIGS. 6A-7B, the spacers 630, 730 each extend through the inner opening of the outer ring 680, 780 to contact the second resonator side 654, 754 such that the spacers 630, 730 are at least partially disposed within the outer ring 680, 780.

Figure 10A:
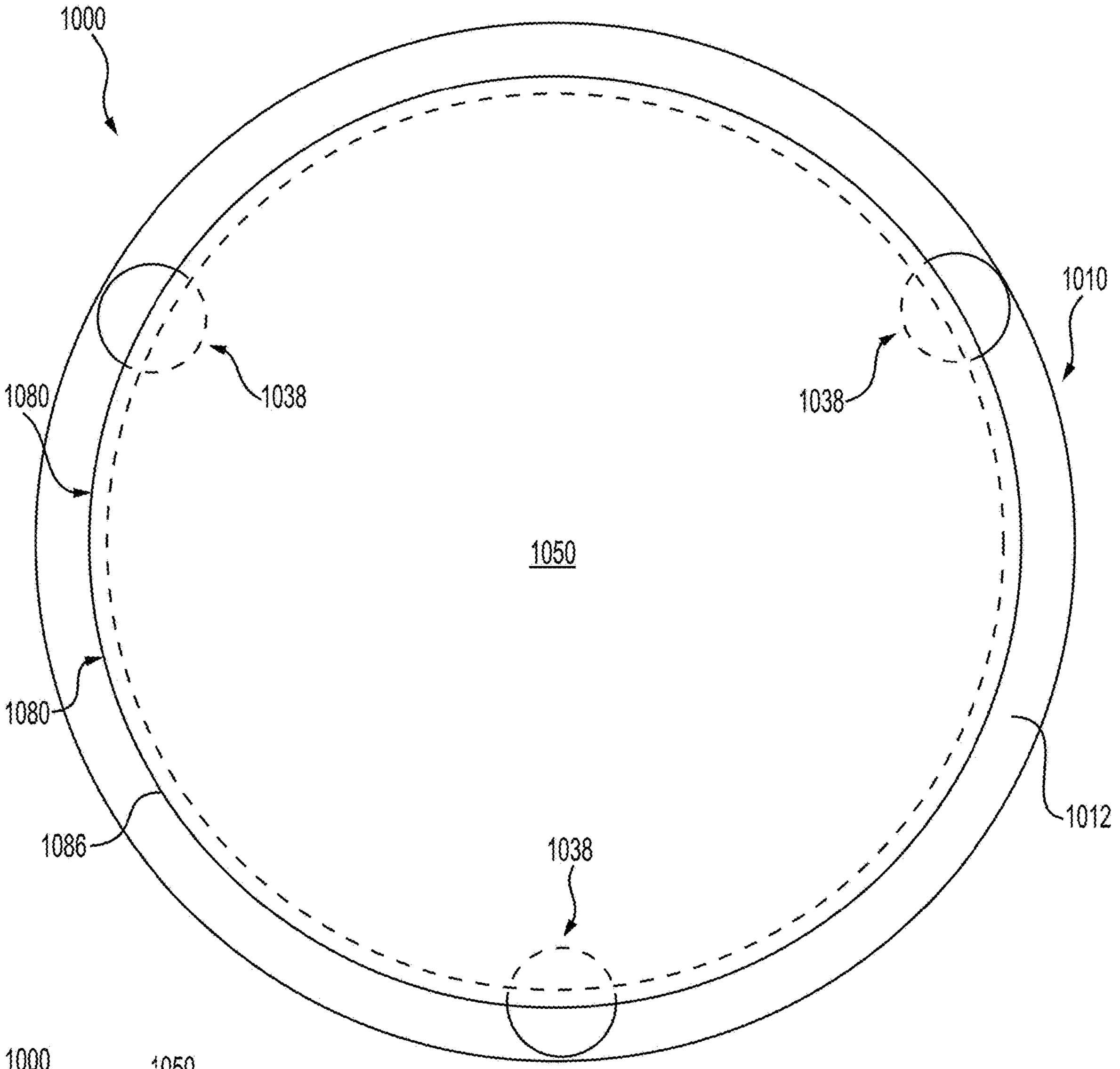
FIG. 10A is a top view of a speaker resonator device, according to another implementation.
Figure 10B:
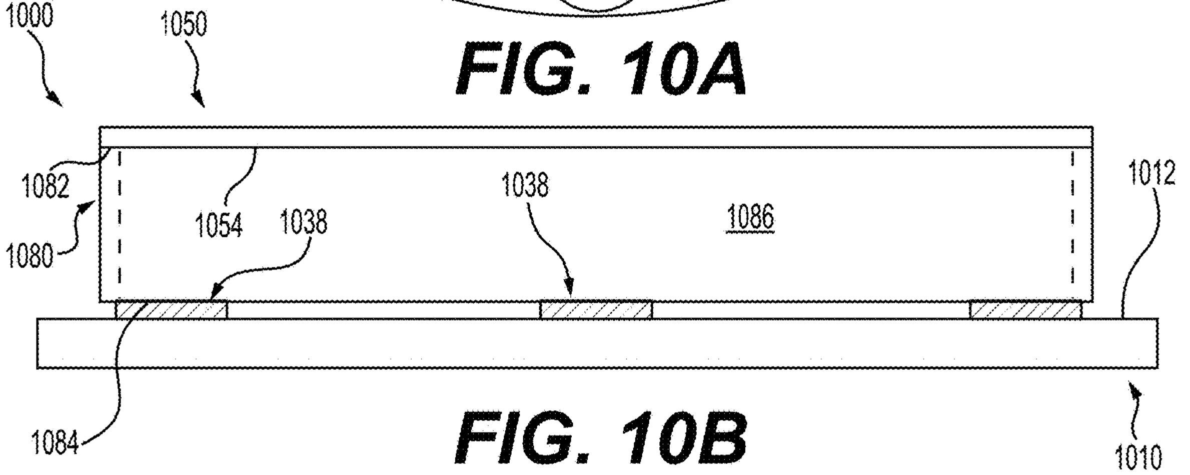
FIG. 10B is a side view of the speaker resonator device of FIG. 10A.

In some implementations, the outer ring is part of or the entirety of the one or more spacers. For example, FIGS. 10A-10B show an implementation of a device 1000 in which the outer ring 1080 acts as the entirety of the spacers. The first base side 1012 of the base plate 1010 of the device 1000 includes three felt pads 1038 configured such that the second ring end 1084 of the outer ring 1080 contacts each of the felt pads 1038. Thus, the outer ring 1080 itself spaces the resonator plate 1050 apart from the base plate 1010.

Figure 11A:
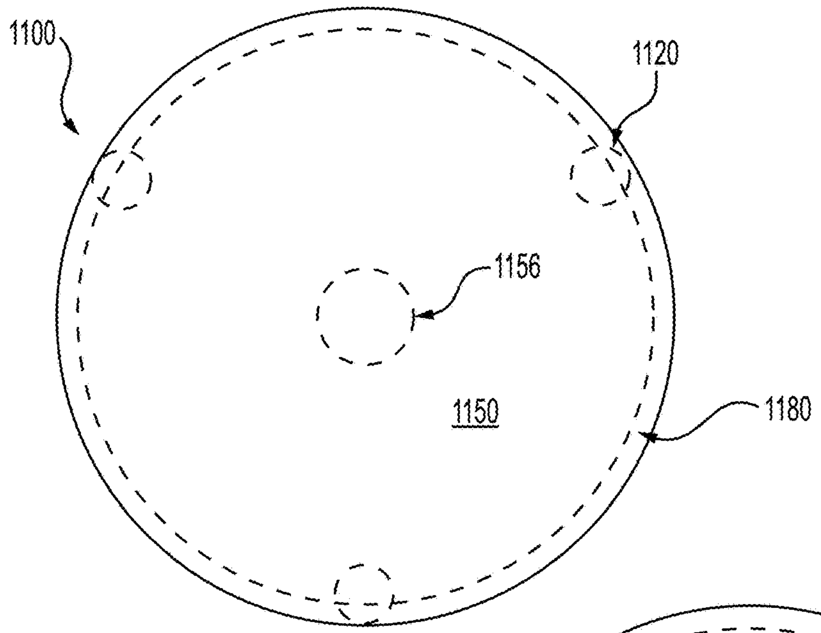
FIG. 11A is a top view of a speaker resonator device, according to another implementation.
Figure 11B:
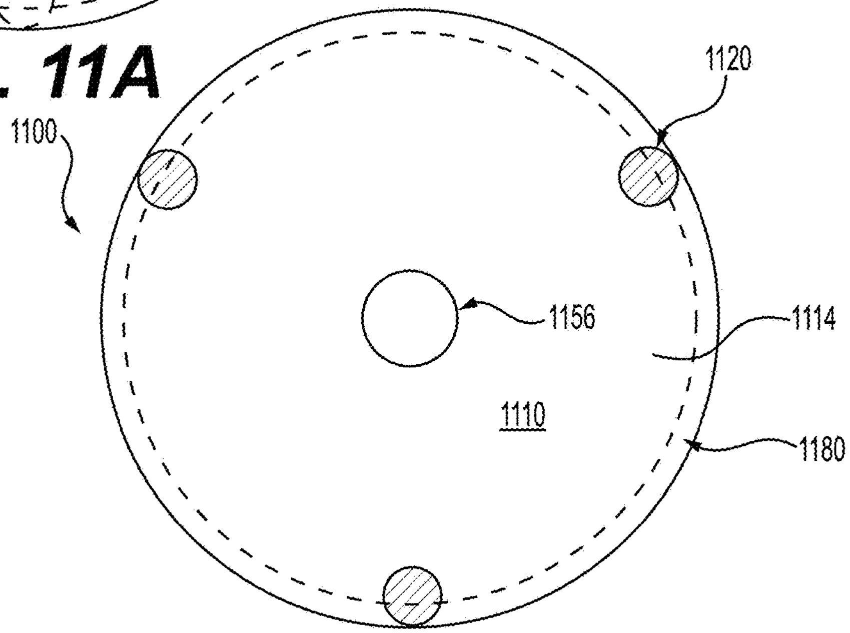
FIG. 11B is a bottom view of the speaker resonator device of FIG. 11A.
Figure 11C:
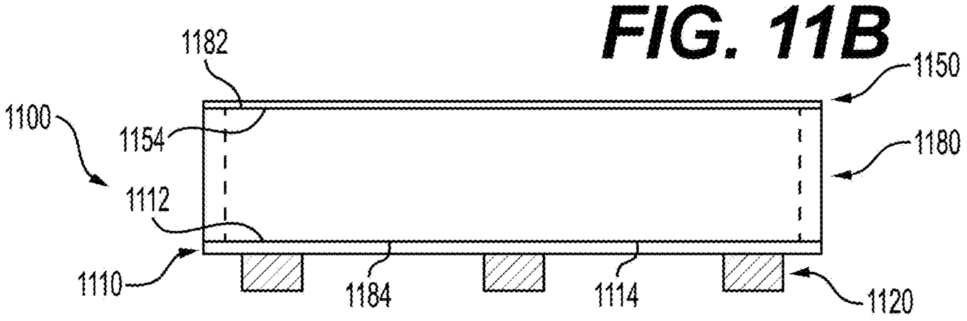
FIG. 11C is a side view of the speaker resonator device of FIG. 11A.

In another implementation shown in FIGS. 11A-11C, the device 1100 does not include any felt pads between the outer ring 1180 and the first base side 1112 of the base plate 1110. Instead, the first ring end 1182 of the outer ring 1180 is coupled to the second resonator side 1154 of the resonator plate 1150, and the second ring end 1184 of the outer ring 1180 is coupled to the first base side 1112 of the base plate 1110. In this implementation, the outer ring 1180 acts as the entirety of the spacers. Thus, the outer ring 1180 itself spaces the resonator plate 1150 apart from the base plate 1110. A sound hole 1156 is defined by the first base side 1112 and extends to the second base side 1114. The outer ring 1180 coupled to both the resonator plate 1150 and the base plate 1110 adds rigidity to both plates 1150, 1110, and makes the device 1100 a single piece, which aids in portability. Vibration absorbent feet 1120 are coupled to the second base side 1114 to elevate the second base side 1114 from the surface on which the device 1100 is resting. This allows the sound hole 1156 to not be covered by the surface such that sound exiting the device 1100 is unobstructed.

FIG. 9C shows and implementation of a device 900 in which the outer ring 980 acts as part of the spacers 930. The spacers 930 of the device 900 include a first spacer portion 930*a* and a second spacer portion 930*b*. The first spacer portion 930*a* is the outer ring 980 extending from the second resonator side 954. The second spacer portion 930*b* includes spacers 930, such as those described elsewhere herein as elongated cylinders. Each of the second spacer portions 930*b* are coupled to a part of the outer ring 980 (i.e., the first spacer portion). In the implementation shown in FIG. 9C, each of the second spacer portions 930*b* are coupled to an inner surface of the outer ring 980. Thus, the second spacer portion 930*b* does not directly contact the resonator plate 950 but is indirectly coupled to the resonator plate 950 via the outer ring 980. The second spacer portions 930*b* shown in FIG. 9C include felt pads 938 that contact the base plate 910.

A number of example implementations are provided herein. However, it is understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device are disclosed herein, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. A speaker resonator device, the device comprising:

a base plate having a first base side and a second base side opposite and spaced apart from the first base side;

one or more spacers each having a first spacer end and a second spacer end opposite and spaced apart from the first spacer end, wherein the second spacer end of each of the one or more spacers contacts the first base side, wherein each of the one or more spacers extends away from the first base side; and a resonator plate having a first resonator side and a second resonator side opposite and spaced apart from the first resonator side, wherein the first spacer end of each of the one or more spacers contacts the second resonator side, wherein the first base side and the second resonator side are spaced apart from each other such that, when a speaker is disposed on the first resonator side, sound from the speaker resonates in a space between the resonator plate and the base plate, and wherein the sound from the speaker resonates between the resonator plate and the base plate at predetermined resonant frequencies.

2. The device of claim 1, wherein the second spacer end of each of the one or more spacers is coupled to the first base side, and wherein the first spacer end of each of the one or more spacers is coupled to the second resonator side.

3. The device of claim 1, further comprising an outer ring having a first ring end and a second ring end opposite and spaced apart from the first ring end, wherein the first ring end is coupled to and extends from the second resonator side toward the first base side.

4. The device of claim 3, wherein an outwardly facing surface of the ring is flush with a perimetrical edge of the resonator plate.

5. The device of claim 3, wherein an annular gap is defined between the outer ring and the first base side, wherein the gap has a width of between 3 mm and 4.5 mm as measured between the first base side and the outer ring.

6. The device of claim 3, wherein the one or more spacers are at least partially disposed within the outer ring.

7. The device of claim 1, wherein the one or more spacers comprise an outer ring extending from the second resonator side of the resonator plate toward the first base side, wherein the first base side includes one or more felt pads, wherein the outer ring contacts the one or more felt pads of the first base side.

8. The device of claim 1, wherein one of the first spacer end or the second spacer end of each of the one or more spacers includes a felt pad that contacts the second resonator side or the first base side, respectively.

9. The device of claim 1, wherein one of the first base side or the second resonator side includes one or more felt pads that contacts the second spacer end or the first spacer end of each of the one or more spacers.

10. The device of claim 9, wherein the one of the first base side or the second resonator side defines one or more channels, wherein the one or more felt pads are disposed within the one or more channels.

11. The device of claim 1, wherein the one or more spacers each include a first spacer portion and a second spacer portion, wherein the first spacer portion includes an outer ring having a first ring end and a second ring end opposite and spaced apart from the first ring end, wherein the first ring end is coupled to and extends from the second resonator side toward the first base side, wherein the second spacer portion extends from the first base side and contacts the second ring end.

12. The device of claim 1, wherein the base has a circular cross-section in a plane parallel to the first base side.

13. The device of claim 1, wherein the resonator plate has a circular cross-section in a plane parallel to the first resonator side.

14. The device of claim 1, wherein each of the spacers has a longitudinal axis extending from the first spacer end to the second spacer end, wherein each of the spacers has a circular cross-section in a plane perpendicular to the longitudinal axis.

15. The device of claim 1, wherein the one or more spacers comprises three or more spacers.

16. The device of claim 1, wherein the one or more spacers are circumferentially spaced apart from each other adjacent to a perimetrical edge of the base plate and/or the resonator plate.

17. The device of claim 1, further comprising one or more vibration absorbent feet coupled to the second base side.

18. The device of claim 1, wherein the base plate or resonator plate comprises wood.

19. The device of claim 1, wherein the first base side defines at least one sound hole extending to the second base side.

20. The device of claim 1, wherein the base plate has a thickness as measured from the first base side to the second base side, wherein the resonator plate has a thickness as measured from the first resonator side to the second resonator side, wherein the thickness of the base plate and/or the resonator plate is in the range of 1 mm-50 mm.

21. The device of claim 20, wherein the thickness of the base plate is different than the thickness of the resonator plate.

22. The device of claim 20, wherein the thickness of the base plate is the same as the thickness of the resonator plate.

23. The device of claim 1, wherein the base plate has a largest width, wherein the resonator plate has a largest width, wherein the largest width of the base plate or the resonator plate is in the range of 10 cm-95 cm.

24. The device of claim 23, wherein the largest width of the base plate is different than the largest width of the resonator plate.

25. The device of claim 23, wherein the largest width of the base plate is the same as the largest width of the resonator plate.

26. The device of claim 1, wherein each of the spacers has a length as measured from the first spacer end to the second spacer end, wherein the length is in the range of 3 mm-460 mm.

27. The device of claim 1, wherein each of the spacers has a largest width, wherein the largest width is in the range of 6 mm-80 mm.

28. The device of claim 1, wherein the one or more spacers comprise an outer ring, wherein the first spacer end is a first ring end and the second spacer end is a second ring end opposite and spaced apart from the first ring end, wherein the first ring end is coupled to the second resonator side and the second ring end is coupled to the first base side.

* * * * *